US010556732B2

(12) United States Patent
Cassidy et al.

(10) Patent No.: US 10,556,732 B2
(45) Date of Patent: Feb. 11, 2020

(54) TABBED SEAL CONCEPTS

(71) Applicant: Selig Sealing Products, Inc., Forrest, IL (US)

(72) Inventors: Stephen P. Cassidy, South Barrington, IL (US); Steven A. Brucker, Gibson City, IL (US); Robert William Thorstensen-Woll, Barrie (CA); John J. Brown, LaGrange, IL (US)

(73) Assignee: Selig Sealing Products, Inc., Forrest, IL (US)

( * ) Notice: Subject to any disclaimer, the term of this patent is extended or adjusted under 35 U.S.C. 154(b) by 78 days.

(21) Appl. No.: 15/554,240

(22) PCT Filed: Mar. 3, 2016

(86) PCT No.: PCT/US2016/020666
§ 371 (c)(1),
(2) Date: Aug. 29, 2017

(87) PCT Pub. No.: WO2016/141175
PCT Pub. Date: Sep. 9, 2016

(65) Prior Publication Data
US 2018/0079576 A1 Mar. 22, 2018

Related U.S. Application Data

(60) Provisional application No. 62/127,545, filed on Mar. 3, 2015.

(51) Int. Cl.
*B65D 77/00* (2006.01)
*B65D 77/20* (2006.01)
(Continued)

(52) U.S. Cl.
CPC .......... *B65D 77/2032* (2013.01); *B29C 65/02* (2013.01); *B29C 65/48* (2013.01);
(Continued)

(58) Field of Classification Search
CPC .... B65D 77/2032; B65D 7/01; B65D 7/2878; B65D 51/20; B65D 77/2024;
(Continued)

(56) References Cited

U.S. PATENT DOCUMENTS 1,818,379 A * 8/1931 Cain ........................ C25D 1/04
205/220
2,768,762 A 10/1956 Guinet
(Continued)

FOREIGN PATENT DOCUMENTS

AT            501393 A1     8/2006
AT            11738 U1     4/2011
(Continued)

OTHER PUBLICATIONS

Patent Cooperation Treaty, International Search Report and Written Opinion dated May 19, 2016 for International Application No. PCT/US2016/020666, 9 pages.

*Primary Examiner* — Ernesto A Grano
(74) *Attorney, Agent, or Firm* — Fitch, Even, Tabin, & Flannery, LLP

(57) ABSTRACT

Tabbed sealing members with a robust tab structure having additional support under the tab and at a tab pivot or hinge joint.

18 Claims, 12 Drawing Sheets

(51) Int. Cl.

| | | |
|---|---|---|
| *B32B 7/05* | (2019.01) | |
| *B29C 65/02* | (2006.01) | |
| *B29C 65/48* | (2006.01) | |
| *B29C 65/00* | (2006.01) | |
| *B32B 3/26* | (2006.01) | |
| *B32B 5/18* | (2006.01) | |
| *B32B 7/12* | (2006.01) | |
| *B32B 15/08* | (2006.01) | |
| *B32B 15/20* | (2006.01) | |
| *B32B 27/08* | (2006.01) | |
| *B32B 27/36* | (2006.01) | |
| *B32B 37/06* | (2006.01) | |
| *B32B 37/12* | (2006.01) | |
| *B29K 667/00* | (2006.01) | |
| *B29K 705/02* | (2006.01) | |
| *B29L 31/56* | (2006.01) | |

(52) U.S. Cl.
CPC ............ *B29C 66/13* (2013.01); *B29C 66/712* (2013.01); *B29C 66/7315* (2013.01); *B29C 66/7422* (2013.01); *B32B 3/266* (2013.01); *B32B 5/18* (2013.01); *B32B 7/05* (2019.01); *B32B 7/12* (2013.01); *B32B 15/08* (2013.01); *B32B 15/20* (2013.01); *B32B 27/08* (2013.01); *B32B 27/36* (2013.01); *B32B 37/06* (2013.01); *B32B 37/1207* (2013.01); *B29K 2667/003* (2013.01); *B29K 2705/02* (2013.01); *B29L 2031/565* (2013.01); *B32B 2305/022* (2013.01); *B32B 2307/54* (2013.01); *B32B 2311/24* (2013.01); *B32B 2367/00* (2013.01); *B32B 2435/02* (2013.01); *B65D 2577/205* (2013.01)

(58) Field of Classification Search
CPC ...... B65D 2251/0093; B65D 2577/205; B65B 7/2878; B65B 7/01; B29C 65/48; B29C 66/13; B29C 66/7315; B29C 66/7422
USPC .......................................................... 220/270
See application file for complete search history.

(56) References Cited

U.S. PATENT DOCUMENTS

| | | | |
|---|---|---|---|
| 3,235,165 A | 2/1966 | Jackson | |
| 3,292,828 A | 12/1966 | Stuart | |
| 3,302,818 A | 2/1967 | Balocca et al. | |
| 3,460,310 A | 8/1969 | Adcock et al. | |
| 3,556,816 A | 1/1971 | Nughes | |
| 3,964,670 A | 6/1976 | Amneus | |
| 3,990,603 A | 11/1976 | Brochman | |
| 4,133,796 A | 1/1979 | Bullman | |
| 4,206,165 A | 6/1980 | Dukess | |
| 4,266,687 A * | 5/1981 | Cummings | A61J 1/1412 215/232 |
| 4,396,655 A | 8/1983 | Graham | |
| 4,556,590 A | 12/1985 | Martin | |
| 4,582,735 A | 4/1986 | Smith | |
| 4,588,099 A | 5/1986 | Diez | |
| 4,595,116 A * | 6/1986 | Carlsson | B65D 5/708 220/260 |
| 4,596,338 A | 6/1986 | Yousif | |
| 4,636,273 A | 1/1987 | Wolfersperger | |
| 4,666,052 A | 5/1987 | Ou-Yang | |
| 4,693,390 A | 9/1987 | Hekal | |
| 4,735,335 A | 4/1988 | Torterotot | |
| 4,741,791 A * | 5/1988 | Howard | D06Q 1/06 156/230 |
| 4,762,246 A * | 8/1988 | Ashley | B65B 7/01 220/270 |
| 4,770,325 A | 9/1988 | Gordon | |
| 4,771,903 A | 9/1988 | Levene | |
| 4,781,294 A | 11/1988 | Croce | |
| 4,801,647 A | 1/1989 | Wolfe, Jr. | |
| 4,811,856 A | 3/1989 | Fischman | |
| 4,818,577 A | 4/1989 | Ou-Yang | |
| 4,837,061 A | 6/1989 | Smits | |
| 4,863,061 A | 9/1989 | Moore | |
| 4,867,881 A | 9/1989 | Kinzer | |
| 4,889,731 A | 12/1989 | Williams | |
| 4,934,544 A * | 6/1990 | Han | B65D 51/20 215/232 |
| 4,938,390 A | 7/1990 | Markva | |
| 4,960,216 A * | 10/1990 | Giles | B65D 51/20 215/232 |
| 4,961,986 A * | 10/1990 | Galda | B65D 51/20 215/232 |
| 5,004,111 A * | 4/1991 | McCarthy | B65D 51/20 215/232 |
| 5,015,318 A | 5/1991 | Smits | |
| 5,053,457 A | 10/1991 | Lee | |
| 5,055,150 A | 10/1991 | Rosenfeld | |
| 5,057,365 A | 10/1991 | Finkelstein | |
| 5,071,710 A | 12/1991 | Smits | |
| 5,098,495 A | 3/1992 | Smits | |
| RE33,893 E | 4/1992 | Elias | |
| 5,106,124 A * | 4/1992 | Volkman | G09F 3/0288 283/103 |
| 5,125,529 A * | 6/1992 | Torterotot | B65D 77/206 215/232 |
| 5,131,556 A | 7/1992 | Iioka | |
| 5,149,386 A | 9/1992 | Smits | |
| 5,178,967 A * | 1/1993 | Rosenfeld | C25D 11/04 156/150 |
| 5,197,618 A | 3/1993 | Goth | |
| 5,217,790 A | 6/1993 | Galda | |
| 5,226,281 A | 7/1993 | Han | |
| 5,261,990 A * | 11/1993 | Galda | B65D 51/20 156/230 |
| 5,265,745 A * | 11/1993 | Pereyra | B65D 51/20 215/232 |
| 5,433,992 A | 7/1995 | Galda | |
| 5,513,781 A | 5/1996 | Ullrich | |
| 5,514,442 A * | 5/1996 | Galda | B65D 51/20 215/232 |
| 5,560,989 A * | 10/1996 | Han | B29C 65/3656 428/349 |
| 5,598,940 A | 2/1997 | Finkelstein | |
| 5,601,200 A | 2/1997 | Finkelstein | |
| 5,615,789 A | 4/1997 | Finkelstein | |
| 5,618,618 A | 4/1997 | Murschall | |
| 5,669,521 A | 9/1997 | Wiening | |
| 5,683,774 A | 11/1997 | Faykish | |
| 5,702,015 A * | 12/1997 | Giles | B32B 37/26 215/232 |
| 5,709,310 A * | 1/1998 | Kretz | B65D 77/2032 215/232 |
| 5,776,284 A * | 7/1998 | Sykes | B32B 38/10 156/192 |
| 5,851,333 A * | 12/1998 | Fagnant | B32B 38/04 156/252 |
| 5,860,544 A | 1/1999 | Brucker | |
| 5,871,112 A | 2/1999 | Giles | |
| 5,887,747 A * | 3/1999 | Burklin | B65D 77/2032 156/244.11 |
| 5,915,577 A | 6/1999 | Levine | |
| 5,975,304 A * | 11/1999 | Cain | B65D 75/326 206/467 |
| 5,976,294 A * | 11/1999 | Fagnant | B31D 1/02 156/192 |
| 6,056,141 A * | 5/2000 | Navarini | B32B 27/06 220/269 |
| 6,082,566 A | 7/2000 | Yousif | |
| 6,096,358 A | 8/2000 | Murdick | |
| 6,131,754 A | 10/2000 | Smelko | |
| 6,139,931 A | 10/2000 | Finkelstein | |
| 6,158,632 A | 12/2000 | Ekkert | |
| 6,194,042 B1 | 2/2001 | Finkelstein | |

(56) References Cited

U.S. PATENT DOCUMENTS

| | | | |
|---|---|---|---|
| 6,290,801 B1 | 9/2001 | Krampe | |
| 6,312,776 B1 | 11/2001 | Finkelstein | |
| 6,378,715 B1 | 4/2002 | Finkelstein | |
| 6,458,302 B1 | 10/2002 | Shifflet | |
| 6,461,714 B1* | 10/2002 | Giles | B65D 51/20 215/232 |
| 6,544,615 B2 | 4/2003 | Otten | |
| 6,548,302 B1 | 4/2003 | Mao | |
| 6,602,309 B2 | 8/2003 | Vizulis | |
| 6,627,273 B2 | 9/2003 | Wolf | |
| 6,669,046 B1* | 12/2003 | Sawada | B65D 77/206 220/270 |
| 6,699,566 B2 | 3/2004 | Zeiter | |
| 6,705,467 B1 | 3/2004 | Kancsar | |
| 6,722,272 B2 | 4/2004 | Jud | |
| 6,767,425 B2 | 7/2004 | Meier | |
| 6,790,508 B2 | 9/2004 | Razeti | |
| 6,866,926 B1* | 3/2005 | Smelko | B32B 5/18 428/319.1 |
| 6,902,075 B2 | 6/2005 | OBrien | |
| 6,916,516 B1* | 7/2005 | Gerber | B32B 3/30 206/807 |
| 6,955,736 B2* | 10/2005 | Rosenberger | B32B 15/08 156/237 |
| 6,959,832 B1* | 11/2005 | Sawada | B65D 77/206 220/266 |
| 6,974,045 B1* | 12/2005 | Trombach | B65D 51/20 215/232 |
| 7,128,210 B2 | 10/2006 | Razeti | |
| 7,182,475 B2 | 2/2007 | Kramer | |
| 7,217,454 B2 | 5/2007 | Smelko | |
| RE39,790 E | 8/2007 | Fuchs | |
| 7,316,760 B2 | 1/2008 | Nageli | |
| 7,448,153 B2 | 11/2008 | Maliner | |
| 7,531,228 B2 | 5/2009 | Perre | |
| 7,648,764 B2 | 1/2010 | Yousif | |
| 7,713,605 B2* | 5/2010 | Yousif | B65D 41/045 428/40.1 |
| 7,740,730 B2 | 6/2010 | Schedl | |
| 7,740,927 B2* | 6/2010 | Yousif | B65D 51/20 428/40.1 |
| 7,789,262 B2 | 9/2010 | Niederer | |
| 7,798,359 B1 | 9/2010 | Marsella | |
| 7,819,266 B2* | 10/2010 | Ross | B32B 5/245 215/230 |
| 7,838,109 B2 | 11/2010 | Declerck | |
| 7,850,033 B2 | 12/2010 | Thorstensen-Woll | |
| 8,025,171 B2* | 9/2011 | Cassol | B65D 77/2056 220/270 |
| 8,057,896 B2* | 11/2011 | Smelko | B65D 77/2032 428/347 |
| 8,129,009 B2 | 3/2012 | Morris | |
| 8,201,385 B2* | 6/2012 | McLean | B32B 27/08 53/411 |
| 8,308,003 B2 | 11/2012 | O'Brien | |
| 8,329,288 B2 | 12/2012 | Allegaert | |
| 8,348,082 B2 | 1/2013 | Cain | |
| 8,906,185 B2 | 12/2014 | McLean | |
| 9,028,963 B2 | 5/2015 | Thorstensen-Woll | |
| 9,102,438 B2 | 8/2015 | Thorstensen-Woll | |
| 9,221,579 B2 | 12/2015 | Thorstensen-Woll | |
| 9,227,755 B2 | 1/2016 | Thorstensen-Woll | |
| 9,440,765 B2 | 9/2016 | Thorstensen-Woll | |
| 9,440,768 B2 | 9/2016 | Thorstensen-Woll | |
| 9,533,805 B2 | 1/2017 | McLean | |
| 9,676,513 B2 | 6/2017 | Thorstensen-Woll | |
| 2001/0023870 A1* | 9/2001 | Mihalov | B29C 65/18 220/359.3 |
| 2001/0031348 A1 | 10/2001 | Jud | |
| 2002/0068140 A1 | 6/2002 | Finkelstein | |
| 2003/0087057 A1 | 5/2003 | Blemberg | |
| 2003/0168423 A1 | 9/2003 | Williams | |
| 2003/0196418 A1* | 10/2003 | O'Brien | B32B 27/08 53/490 |
| 2004/0028851 A1* | 2/2004 | Okhai | B32B 3/266 428/35.2 |
| 2004/0043238 A1 | 3/2004 | Wuest | |
| 2004/0109963 A1 | 6/2004 | Zaggia | |
| 2004/0211320 A1* | 10/2004 | Cain | B01D 53/0446 96/108 |
| 2005/0003155 A1 | 1/2005 | Huffer | |
| 2005/0048307 A1 | 3/2005 | Schubert | |
| 2005/0208242 A1* | 9/2005 | Smelko | B32B 27/08 428/35.7 |
| 2005/0208244 A1 | 9/2005 | Delmas | |
| 2005/0218143 A1 | 10/2005 | Niederer | |
| 2006/0000545 A1* | 1/2006 | Nageli | B32B 27/32 156/272.2 |
| 2006/0003120 A1 | 1/2006 | Nageli | |
| 2006/0003122 A1 | 1/2006 | Nageli | |
| 2006/0068163 A1* | 3/2006 | Giles | B32B 3/04 428/126 |
| 2006/0124577 A1 | 6/2006 | Ross | |
| 2006/0151415 A1 | 7/2006 | Smelko | |
| 2006/0278665 A1 | 12/2006 | Bennett | |
| 2007/0003725 A1 | 1/2007 | Yousif | |
| 2007/0065609 A1 | 3/2007 | Korson | |
| 2007/0267304 A1 | 11/2007 | Portier | |
| 2007/0298273 A1* | 12/2007 | Thies | B32B 27/32 428/516 |
| 2008/0026171 A1 | 1/2008 | Gullick | |
| 2008/0073308 A1 | 3/2008 | Yousif | |
| 2008/0103262 A1 | 5/2008 | Haschke | |
| 2008/0145581 A1 | 6/2008 | Tanny | |
| 2008/0156443 A1 | 7/2008 | Schaefer | |
| 2008/0169286 A1 | 7/2008 | McLean | |
| 2008/0231922 A1 | 9/2008 | Thorstensen-Woll | |
| 2008/0233339 A1 | 9/2008 | Thorstensen-Woll | |
| 2008/0233424 A1* | 9/2008 | Thorstensen-Woll | B32B 7/06 428/621 |
| 2009/0078671 A1 | 3/2009 | Triquet | |
| 2009/0208729 A1 | 8/2009 | Allegaert | |
| 2009/0304964 A1 | 12/2009 | Sachs | |
| 2010/0009162 A1 | 1/2010 | Rothweiler | |
| 2010/0030180 A1 | 2/2010 | Deckerck | |
| 2010/0047552 A1 | 2/2010 | McLean | |
| 2010/0059942 A1 | 3/2010 | Rothweiler | |
| 2010/0116410 A1* | 5/2010 | Yousif | B29C 65/76 156/73.1 |
| 2010/0155288 A1* | 6/2010 | Harper | B32B 3/28 206/531 |
| 2010/0170820 A1 | 7/2010 | Leplatois | |
| 2010/0193463 A1 | 8/2010 | OBrien | |
| 2010/0213193 A1 | 8/2010 | Helmlinger | |
| 2010/0221483 A1* | 9/2010 | Gonzalez Carro | B32B 7/14 428/66.4 |
| 2010/0290663 A1 | 11/2010 | Trassl | |
| 2010/0314278 A1 | 12/2010 | Fonteyne | |
| 2011/0000917 A1 | 1/2011 | Wolters | |
| 2011/0005961 A1 | 1/2011 | Leplatois | |
| 2011/0089177 A1 | 4/2011 | Thorstensen-Woll | |
| 2011/0091715 A1 | 4/2011 | Rakutt | |
| 2011/0100949 A1 | 5/2011 | Grayer | |
| 2011/0100989 A1* | 5/2011 | Cain | B29C 65/76 220/270 |
| 2011/0138742 A1 | 6/2011 | McLean | |
| 2011/0147353 A1 | 6/2011 | Kornfeld | |
| 2011/0152821 A1* | 6/2011 | Kornfeld | B32B 3/266 604/403 |
| 2012/0000910 A1 | 1/2012 | Ekkert | |
| 2012/0043330 A1 | 2/2012 | McLean | |
| 2012/0067896 A1 | 3/2012 | Daffner | |
| 2012/0103988 A1 | 5/2012 | Wiening | |
| 2012/0111758 A1 | 5/2012 | Lo | |
| 2012/0241449 A1 | 9/2012 | Frischmann | |
| 2012/0285920 A1 | 11/2012 | McLean | |
| 2013/0020324 A1 | 1/2013 | Thorstensen-Woll | |
| 2013/0020328 A1 | 1/2013 | Duan | |
| 2013/0121623 A1 | 5/2013 | Lyzenga | |
| 2013/0177263 A1 | 7/2013 | Duan | |
| 2014/0001185 A1 | 1/2014 | McLean | |
| 2014/0061196 A1 | 3/2014 | Thorstensen-Woll | |

(56) References Cited

U.S. PATENT DOCUMENTS

| | | |
|---|---|---|
| 2014/0186589 A1 | 7/2014 | Chang |
| 2014/0224800 A1 | 8/2014 | Thorstensen-Woll |
| 2015/0053680 A1 | 2/2015 | Yuno |
| 2015/0197385 A1 | 7/2015 | Wei |
| 2016/0185485 A1 | 6/2016 | Thorstensen-Woll |
| 2017/0253373 A1 | 9/2017 | Thorstensen-Woll |

FOREIGN PATENT DOCUMENTS

| | | |
|---|---|---|
| BR | 8200231 U | 9/2003 |
| BR | 0300992 A | 11/2004 |
| CA | 2015992 A1 | 1/1991 |
| CA | 2203744 A1 | 10/1997 |
| CN | 1301289 A | 6/2001 |
| DE | 102006030118 B3 | 5/2007 |
| DE | 10204281 A1 | 8/2007 |
| DE | 102007022935 B4 | 4/2009 |
| DE | 202009000245 U1 | 4/2009 |
| EP | 0135431 A1 | 3/1985 |
| EP | 0668221 A1 | 8/1995 |
| EP | 0826598 A2 | 3/1998 |
| EP | 0826599 A2 | 3/1998 |
| EP | 0905039 A1 | 3/1999 |
| EP | 0717710 B1 | 4/1999 |
| EP | 0915026 A1 | 5/1999 |
| EP | 0706473 B1 | 8/1999 |
| EP | 1075921 A2 | 2/2001 |
| EP | 1199253 A2 | 4/2002 |
| EP | 0803445 B1 | 11/2003 |
| EP | 1462381 A1 | 9/2004 |
| EP | 1199253 B1 | 3/2005 |
| EP | 1577226 A1 | 9/2005 |
| EP | 1814744 A1 | 8/2007 |
| EP | 1834893 A1 | 9/2007 |
| EP | 1837288 A1 | 9/2007 |
| EP | 1839898 A1 | 10/2007 |
| EP | 1839899 A1 | 10/2007 |
| EP | 1857275 A1 | 11/2007 |
| EP | 1873078 A1 | 1/2008 |
| EP | 1445209 B1 | 5/2008 |
| EP | 1918094 A1 | 5/2008 |
| EP | 1935636 A1 | 6/2008 |
| EP | 1968020 A1 | 9/2008 |
| EP | 1992476 A1 | 11/2008 |
| EP | 2014461 A1 | 1/2009 |
| EP | 2230190 A1 | 9/2010 |
| EP | 2292524 A1 | 3/2011 |
| EP | 2599735 A1 | 6/2013 |
| FR | 2916157 A1 | 11/2008 |
| FR | 2943322 A1 | 9/2010 |
| GB | 1216991 A | 12/1970 |
| GB | 2353986 A | 3/2001 |
| GB | 2501967 A | 11/2013 |
| JP | H09110077 A | 4/1997 |
| KR | 100711073 B1 | 4/2007 |
| KR | 100840926 B1 | 6/2008 |
| KR | 100886955 B1 | 3/2009 |
| MX | 05002905 A | 2/2006 |
| MX | 2010001867 A | 4/2010 |
| TW | 201217237 A | 5/2012 |
| WO | 9905041 A1 | 2/1999 |
| WO | 0066450 A1 | 11/2000 |
| WO | 2005009868 A1 | 2/2005 |
| WO | 2006018556 A1 | 2/2006 |
| WO | 2006021291 A1 | 3/2006 |
| WO | 2006073777 A1 | 7/2006 |
| WO | 2006108853 A1 | 10/2006 |
| WO | 2008027029 A2 | 3/2008 |
| WO | 2008027036 A1 | 3/2008 |
| WO | 2008039350 A2 | 4/2008 |
| WO | 2008118569 A2 | 10/2008 |
| WO | 2008125784 A1 | 10/2008 |
| WO | 2008125785 A1 | 10/2008 |
| WO | 2008148176 A1 | 12/2008 |
| WO | 2009092066 A2 | 7/2009 |
| WO | 2010115811 A1 | 10/2010 |
| WO | 2011039067 A1 | 4/2011 |
| WO | 2012079971 A1 | 6/2012 |
| WO | 2012113530 A1 | 8/2012 |
| WO | 2012152622 A1 | 11/2012 |
| WO | 2012172029 A1 | 12/2012 |
| WO | 2015119988 A1 | 8/2015 |

\* cited by examiner

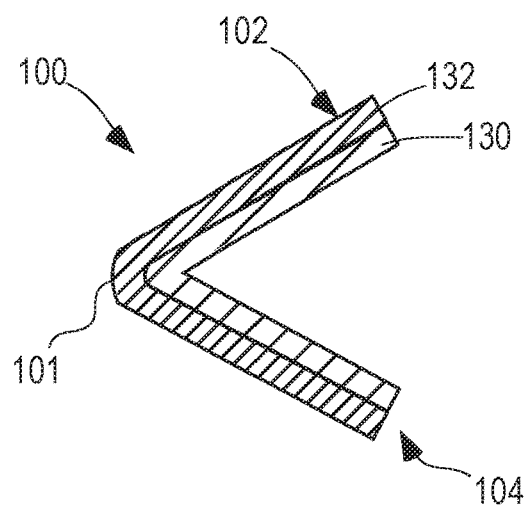
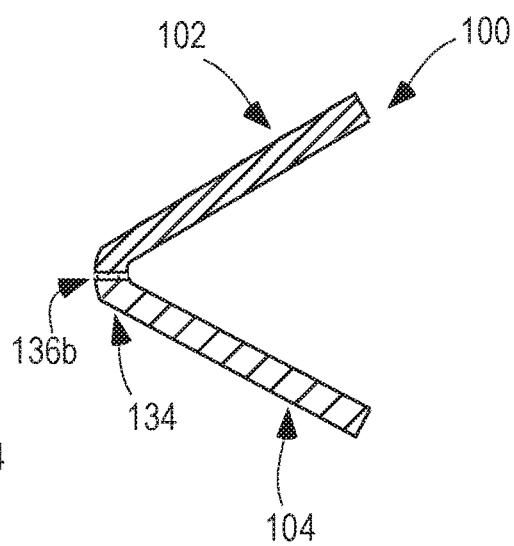
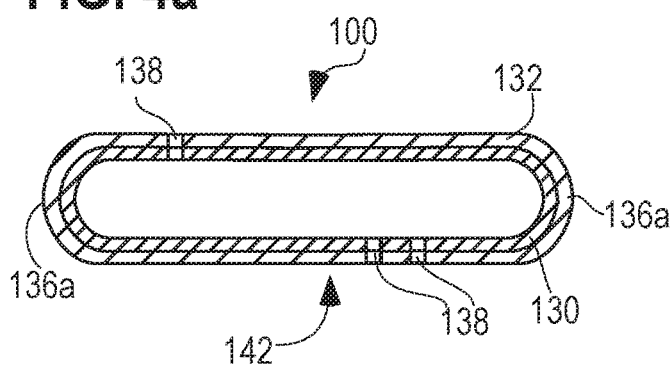
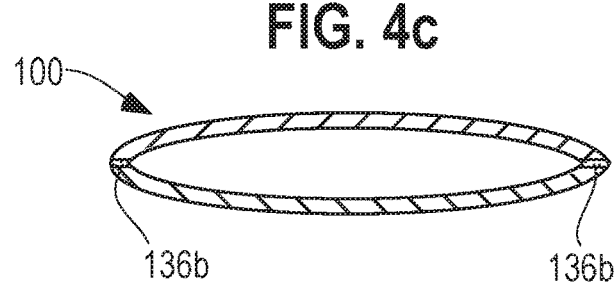
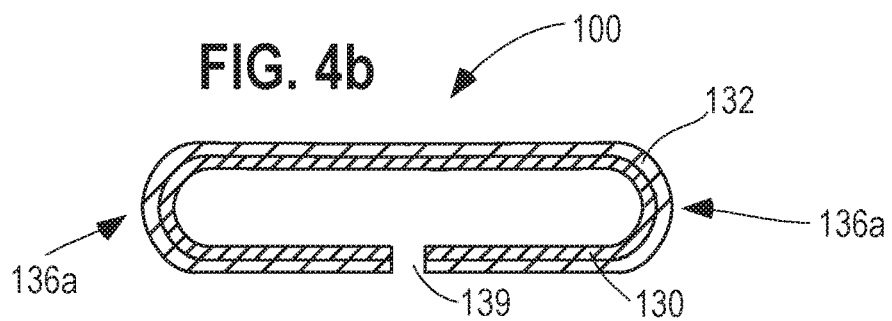

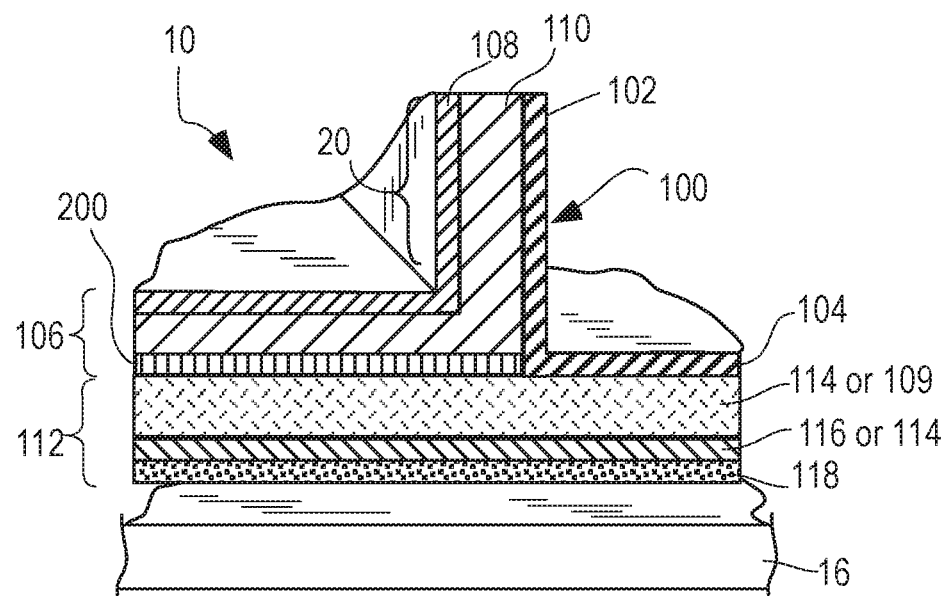
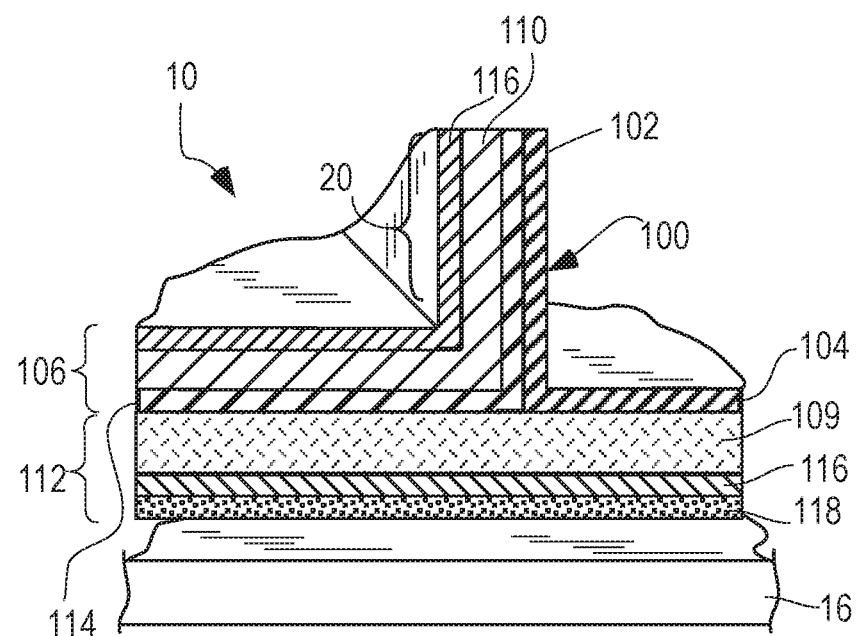

FIG. 16
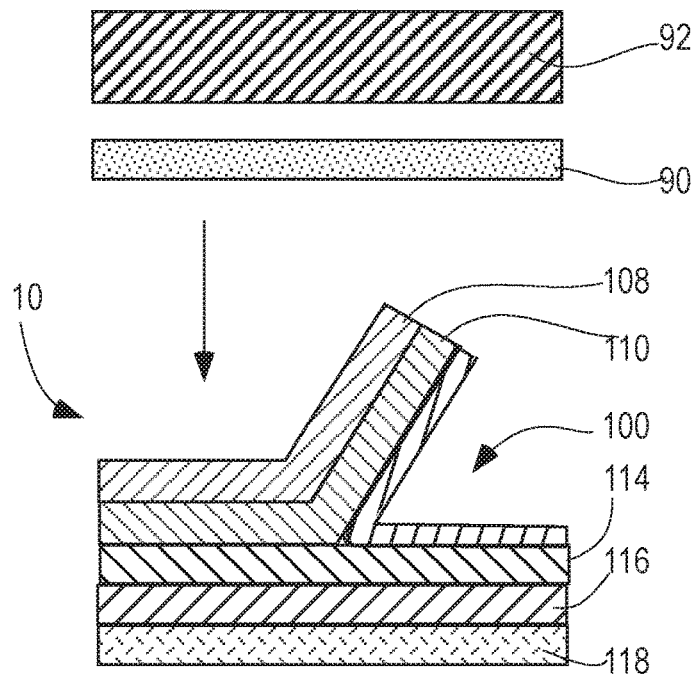
FIG. 17
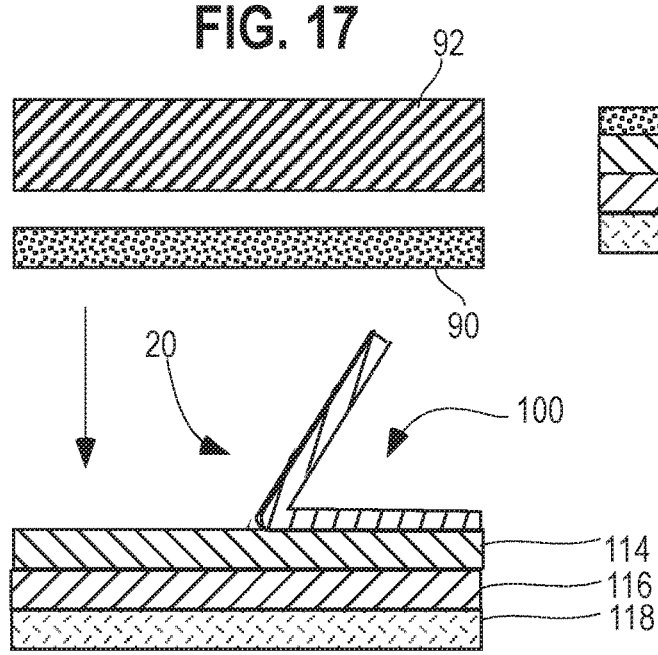
FIG. 17a

TABBED SEAL CONCEPTS

CROSS-REFERENCE TO RELATED APPLICATIONS

This application is a U.S. national phase application filed under 35 U.S.C. § 371 of International Application Number PCT/US2016/020666, filed Mar. 3, 2016, designating the United States, which claims benefit of the U.S. Provisional Application No. 62/127,545, filed Mar. 3, 2015.

FIELD

The disclosure relates to tabbed seals for containers, methods of making such tabbed seals, and in particular, improvements for forming tabs on seal laminates for containers.

BACKGROUND

It is often desirable to seal the opening of a bottle, jar or other container opening using a sealing member or inner seal. Often a cap or other closure is then screwed or placed on the neck or other container opening. In use, a consumer typically removes the cap or other closure to gain access to the seal and removes or otherwise peels the seal from the container in order to dispense or gain access to its contents.

Initial attempts at sealing a container opening included an induction- or conduction-type inner seal covering the container's opening where the seal generally conformed to the shape of the opening such that a circular container opening was sealed with a round disk approximately the same size as the opening and its rim or upper surface. These prior seals commonly had a lower layer of heat activated sealing material to secure a periphery of the seal to a rim or upper surface surrounding a container's opening. Upon exposing the seal to heat, the lower layer bonds to the container rim. In many cases, these seals included a foil layer to provide induction heat to activate the lower heat seal layer. These prior seals tended to provide good sealing, but can be difficult for a consumer to remove because there was nothing for the consumer to grab in order to remove the seal. Often, the consumer needed to pick at the seal's edge with a fingernail because there was little or no seal material to grasp.

Other types of seals for containers include a side tab or other flange that extends outwardly from a peripheral edge of the seal. These side tabs are generally not secured to the container rim and provide a grasping surface for a consumer to hold and peel off the seal. These side tabs, however, extend over the side of the container rim and often protrude into a threaded portion of the closure. If the side tab is too large, this configuration may negatively affect the ability of the seal to form a good seal. The side tabs (and often the unsealed liner itself) can be deformed or wrinkled when the closure or other cap is placed on the container due to contact between the closure and tabbed part of the seal. To minimize these concerns, the side tabs are often very small; thus, providing little surface area or material for a consumer to grasp in order to remove the seal.

Yet other types of seals include a sealing member having a tab defined on the top of the seal. One approach of these prior seals includes a partial layer of coated pressure sensitive adhesive to secure the tab to a layer of metal foil. This type of top-tabbed seal offers the advantage of a larger tab, which provides more grasping area for the consumer to hold and peel off the seal. In this approach, the tab was formed by a full layer extending across the entire surface of the sealing member, but the full layer was only bonded to half of the seal to form the tab. In other approaches, the seal may include a tab formed from the additional full layer of film combined with an additional full layer of adhesive utilizing a part paper or part polymer layer, called a release layer or tab stock, to form the tab. This part layer is inserted between the additional full layer of adhesive and lower seal portions to prevent the tab from sticking to the layers below, which formed the tab.

BRIEF DESCRIPTION OF THE DRAWINGS

FIG. 3A is a cross-sectional view of an exemplary folded release layer having a dead fold;

FIG. 3B is a cross-sectional view of an exemplary folded release layer formed from two separate layers bonded or welded together;

FIG. 4a is a cross-sectional view of an exemplary cylindrical release layer;

FIG. 4B is a cross-sectional view of an exemplary wrapped release layer, which is not a tube, forming a gap therein upon the ends being wrapped back toward each other;

FIG. 4C is a cross-sectional view of an exemplary cylindrical release layer formed via two separate layers (so that the cylinder is not one integral or continuous tubular material) and heat bonded or welded at opposing ends thereof;

FIG. 11 is a cross-sectional view of a tabbed sealing member including a segmented layer adjacent the various release layers herein to equalize pressure and/or thickness between the tabbed and non-tabbed sides of the seal;

FIG. 12 is a cross-sectional view of a tabbed sealing member including a foil layer moved above the various release layers herein so that the foil is positioned up in the tab;

FIG. 16 is a cross-sectional view of an exemplary tabbed sealing member constructed as a two-piece assembly with a wax bonded liner applied thereto;

FIG. 17 is a cross-sectional view of an alternative two-piece assembly including a tabbed sealing member with a wax bonded liner applied thereto, the tabbed sealing member includes a folded, wrapped, or cylindrical release layer forming a tab with no other layers in an upper laminate;

FIG. 17a is a cross-sectional view of the tabbed sealing member of FIG. 17 with an added foamed polymer layer or non-foamed heat distributing layer;

FIG. 19 is a cross-sectional view of a film laminate including a layer of EVA bonded to a PET film utilizing a part polymer layer in between.

DETAILED DESCRIPTION

Figure 1:
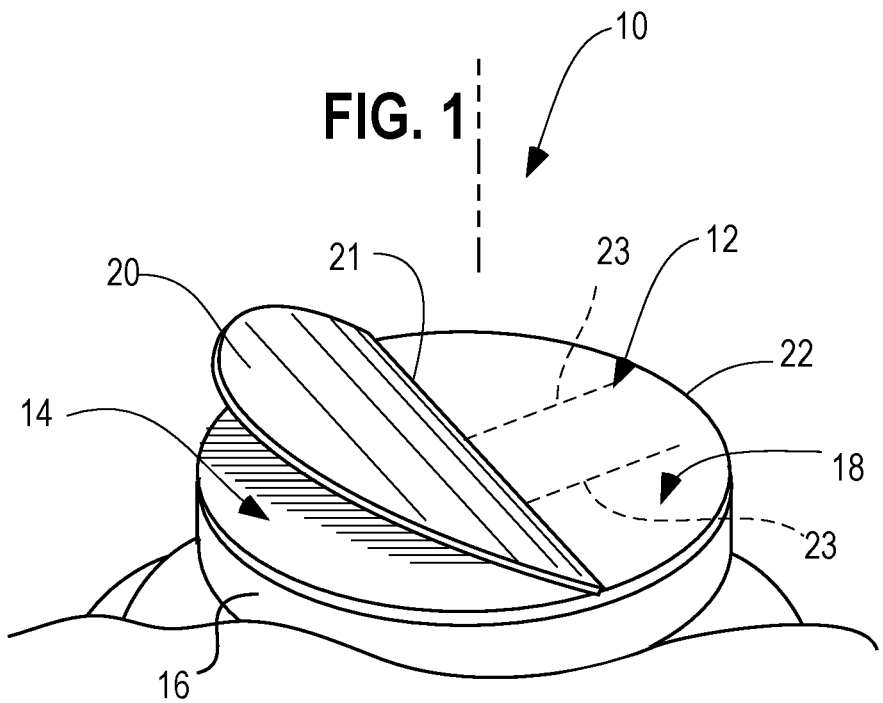
FIG. 1 is a perspective view of an exemplary tabbed sealing member.

As mentioned above, tabbed sealing members are often used with a cap or other closure on a container. The cap or other closure is typically screwed or otherwise secured to a finish or neck of a container capturing the tabbed sealing member between the top of the cap and container rim. In many instances, the cap has an annular bead or downwardly protruding ring (sometimes called a bead line) on the underside of its top inner surface. This annular bead is sized and positioned to generally correspond with an upper land area of the container rim when the cap is secured to the container. This annular bead helps provide pressure to secure the sealing member to the rim land area. However, many of the prior sealing members included a foam layer or other low melting point polymer layers to provide support and/or insulation from heat generated during the heat sealing process. In some cases, there can be problems with the foam layer or polymer layers interacting with the cap annular bead during the cap sealing process. Heat from the cap sealing process combined with the focused downward pressure from the annular bead on the foam layer or other low melting point polymer layer in the sealing member can damage or result in deterioration of the foam layer or other polymer layer in the areas above the container rim. In extreme cases, the polymer layers may melt, degrade, or air cells in the foam may collapse. This shortcoming is more prevalent when the cap sealing process is over sealed (that it, when too much heat is applied or heat is applied for too long during the cap sealing process).

This melting and/or cell collapse may result in exposure of the metal foil or other polymer layers lower in the laminate and/or at the peripheral areas of the sealing member. In some cases, when the consumer lifts up the tab to remove the sealing member, the consumer is presented with an unsightly seal having uneven top layers under the tab with intact center portions and melted or damaged edge portions. In extreme cases, the outer peripheral portions of the laminate under the tab may melt completely, which exposes the metal foil or other layers under the tab.

With prior sealing members including a tab that is preferably defined wholly within a perimeter of the sealing member and formed by a partial release layer, upon pulling of the tab, there tends to be a stress focal point right at the juncture or hinge joint where the tab pivots upwardly. Generally, the stress upon tab pulling radiates downwardly and away from this hinge joint into the layers below the tab and, in some cases, results in a tearing of the layer immediately below the tab at the hinge joint or tearing of the tab at the hinge joint. These failures, in some instances, tend to be more problematic in prior tabbed sealing member designs when the layer immediately below the tab is a foamed polymer but may also occur in other types of layers depending on the thickness, compositions, and/or density of such lower layers.

The various tabbed sealing members described herein provide a more robust tabbed structure by providing additional support under the tab at the laminate periphery and also at the tab pivot or hinge joint between an upper member or upper laminate and a lower member or lower laminate. This robust structure provides concentric stability to the tabbed sealing member so that the tabbed sealing member generally maintains consistent integrity at its peripheral edge about the container rim land area consistent with the structural integrity at radially inner portions away for the edge. The structures herein also provide hinge stability by added support at the hinge or pivot joint of the tab to provide further strength and aid in dissipating pulling stress upon a user pulling a pivoted tab. Thus, the sealing members herein tend to maintain the integrity of the layers below the tab both at the peripheral edge as well as the tab hinge joint both in a heat sealing process and during consumer seal removal when pulling on the tab.

For instance, the structures herein may provide a more rigid, non-foam layer at the tab pivot or hinge joint and also a more rigid, non-foam layer underneath the focal point of the tab pulling stress to provide a more robust laminate structure upon tab pulling. In the present approaches, the pulling stresses are dissipated throughout a more rigid pivot or hinge joint, in which the hinge is supported, in some approaches, by a living hinge joint of the same material supporting other portions of the tab. In some approaches, the hinge and hinge joint are also configured to dissipated stress downwardly throughout a denser, more rigid layer below the tab hinge joint thereby providing a more robust tab capable of withstanding even stronger heat seal bonds to containers.

In general, the concepts herein describe a pull-tab sealing member (or laminate sheets for forming such pull-tab sealing member) for a container including an upper member or upper laminate having a pull-tab bonded to a lower member or lower laminate capable of being heat sealed to a container's mouth or opening. In one aspect, the sealing members herein include a pull or grip tab defined in the upper laminate portion wholly within a perimeter of the sealing member. The various sealing members and laminates herein include improved structures to form a more robust and stronger tab as set forth above Turning to more of the details and as generally shown in Figures herein, tabbed sealing members with a strengthened free tab are shown. In FIG. 1, a generic tabbed sealing member 10 is provided as a laminate 12 formed from flexible sheet materials and/or extruded film materials with a lower member or lower laminate portion 14 for bonding to a container's rim 16 and an upper member or upper laminate portion 18 that is partially bonded to the lower member to form a free portion or a gripping tab 20 (at hinge joint 21) that is preferably defined wholly within a perimeter 22 of the tabbed sealing member 10. In use, by pulling on the tab 20, a user can pivot the tab upwardly as shown in FIG. 1 at the hinge joint 21 and use the tab to remove the sealing member from a container rim or other container portion 16. In one approach, by pulling on the tab 20, the sealing member is removed from the container rim in one piece.

Figure 2:
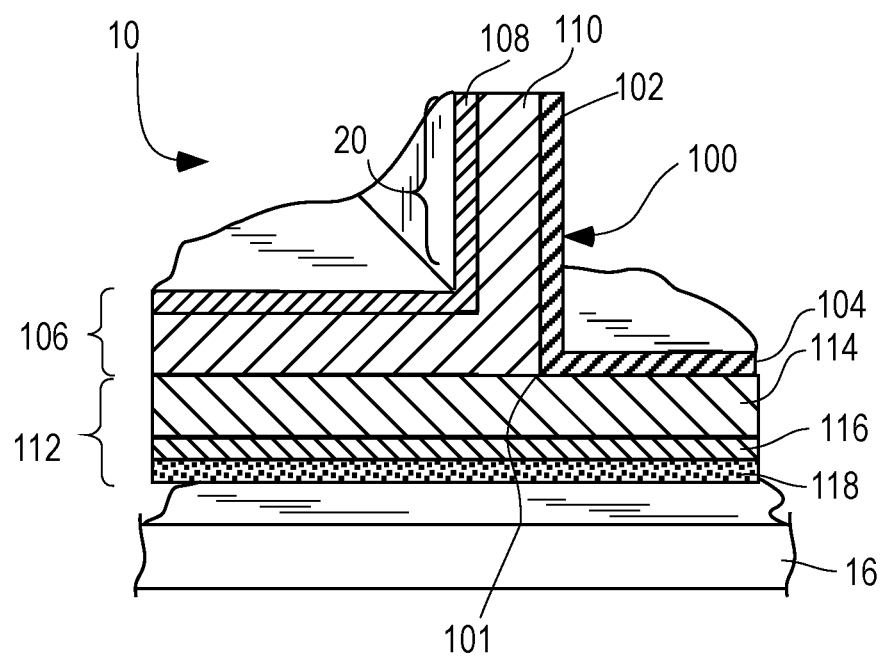
FIG. 2 is a cross-sectional view of a tabbed sealing member including a release layer formed from a folded, wrapped, or cylindrical release film, paper, or foam layer, the release layer may be single or multi-layer or may be coextruded layers.

FIG. 2 illustrates more details on how one exemplary tab 20 is formed in the context of the present disclosure. In the approach of FIG. 2, the tab is formed from a folded, wrapped, or cylindrical release layer 100 or sheet that includes a dead fold 101 therein. The folded release layer 100 forms a top folded part 102 that is bonded to the layers above it and a lower folded part 104 that is bonded to the layers below it. The dead fold 101 is inbetween the top and lower folded parts 102 and 104. Preferably, the folded release layer 100 is not a tube or obtained from a tube or any tubular material. The inside surfaces of the top and bottom folded parts 102 and 104 of the release layer 100 are not bonded to each other and permit the tab 20 to be formed at the dead fold or hinge line because the top folded part and any layers above it are not bonded or secured to the layers below it forming a free portion that can pivot upwardly.

In the approach of FIG. 2, the seal 10 includes an upper laminate 106 with at least a support polymer layer 108 and a bonding layer 110. The seal may also include a lower laminate 112 with a foil 114, an optional polymer layer 116, and a lower sealant or heat seal layer 118. The seal of FIG. 2 includes various layers that are only examples of what layers can be included with the folded release layer 100 to form a tabbed sealing member with a strengthened tab. Other layers may be included as needed. For instance, the seal of FIG. 2 may also include a foamed or non-foamed polymer layer above the foil and under the tab as discussed further herein.

Figure 2A:
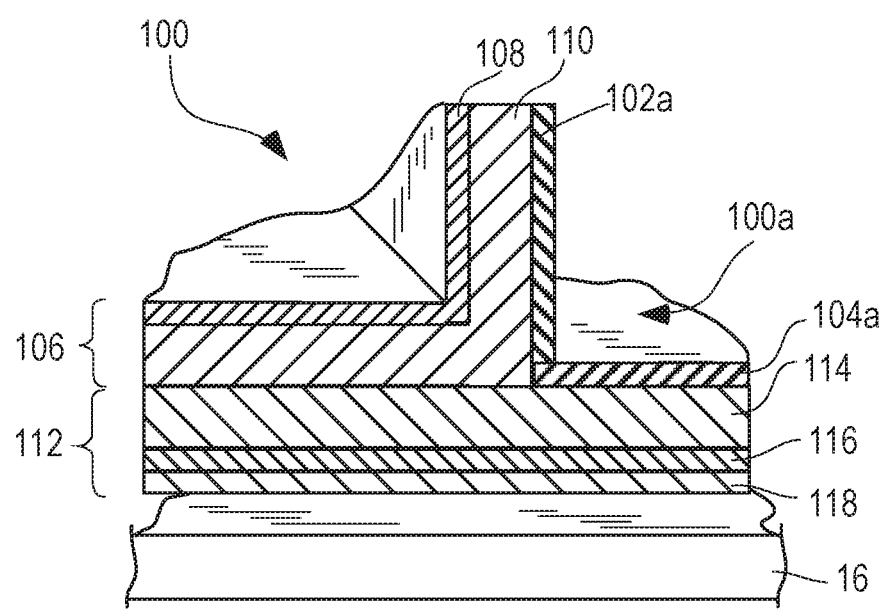
FIG. 2A is a cross-sectional view of an alternative tabbed sealing member with a two-part release layer.

In yet another approach as shown in FIG. 2a, an alternative release layer 100a is shown where the release layer 100a is not a continuous folded sheet, wrap, or cylinder with a dead fold, but two separate layers 102a and 104a that are not joined or integral to each other (and, thus, does not include the dead fold). That is, the top part 102a may be a separate layer from the bottom part 104a where each is joined to the layer adjacent to them, but not each other. More specifically, layer 102a may be joined to the layers above it, and layer 104a may be joined to the layers below it, but layers 102a and 104a are not joined or adhered to each other.

FIGS. 3a, 3b, 4a, 4b, and 4c provide further examples of exemplary folded release layers or sheets. These release layers may be used with any of the tabbed sealing members of this disclosure. FIG. 3a shows more detail of one type of an exemplary folded release layer 100, which may be a single layer (not shown) or, as shown more specifically in FIG. 3a, a multi-layer laminate or coextruded film having more than one layer. The folded release layer is formed, not as a tube, but from a flat sheet that is folded together. In the Figures, two layers are shown forming the folded release layer structure, but the laminate or coextruded film may include other layers as needed for a particular application. In the exemplary structure of FIG. 3a, the folded release layer 100 may include an inner layer 130, such as an inner support polymer layer like polyester (e.g., polyethylene terephthalate (PET)) or an inner paper layer. The folded release layer 100 may then have an outer layer 132 that may be a laminate with or a co-extrudate with the inner layer. The outer layer 132 may be a heat bondable polymer (such as ethylene vinyl acetate (EVA), ethylene methyl acrylate (EMA), polypropylene, polyethylene, polyurethane, copolymers thereof, and the like); a foamed polymer layer (such as a foamed polyolefin); another polymer layer with a lower melting point than the inner layer; and/or an adhesive layer. The inner layer 130 may also be a foamed polymer layer. The folded release layer 100 may also include more than two layers and include any combination of the above suggested layers (polymer, foam, paper, adhesive, etc.). There may be a thin adhesive tie layer between the two layers or even a 3 layer laminate with an adhesive bonding layer between the inner and outer layers. In some approaches, the outer layer 132 permits the folded release layer 100 the ability to bond to the upper and lower laminates, by a heat bond or an adhesive bond, as generally shown in FIG. 2.

In an alternative approach, the folded release layer 100 may include a foamed polymer layer as the inner layer combined with the outer layer being a polymer support (e.g., PET, PEN, nylon, and the like) combined with an adhesive or heat bondable polymer (e.g., EVA). Alternatively, the folded release layer 100 may also be a single foam layer or a single foam layer with a thin layer of adhesive on an outer surface thereof.

In yet another approach, the folded release layer 100 may be a paper layer with adhesive or heat bondable material (e.g., EVA and the like) on an outer surface thereof or a polycoated paper with adhesive or any heat bondable material on an outer surface thereof. As explained further below, the release layer 100 (in any of the approaches above) may also be perforated with holes, slits, micro-perforations, and the like as needed to permit ease in folding and removal of air from the interior of the folded assembly.

FIG. 3b shows yet another approach of a folded release layer 100. In this approach, the upper folded part 102 is a separate layer from the bottom folded part 104 so that the folded release layer is not-continuous and each of the folded parts are not integral with each other. In this approach, the two parts 102 and 104 may be bonded by heat, adhesive, cold seals, or other bonds to join one end of each folded part at a weld joint 134. Here, the layer 100 may be any of the single or multi-layer films and materials as previously described with FIG. 3a.

In the approaches of FIGS. 3a and 3b, the folded release layer 100 is preferably not a tube and is not formed via any tubular material or film, but is formed via a flat sheet of film (or laminate of multi-layers as the case may be) and then folded to form the dead fold 101 or joined to form a weld point 136b prior to insertion into the desired laminate, such as that shown in FIG. 2 or any of the other structures herein.

In another approach, as shown in FIG. 4a, the release layer 100 may be formed via cylindrical material, sheet, or film, or a cylindrical material, sheet, or film that is either slit, cut, and/or folded prior to insertion into the laminate (such as the laminate of FIG. 2) or is inserted as a folded cylinder into the laminate and cut during die cutting to form the final tabbed seal member where the cylinder is then cut to form the release layer. As shown in FIG. 4a, the release layer 100 may also be a folded cylinder that includes two opposing dead folds 136a. As shown, the cylinder may also include multiple layers similar to those previously discussed above and the reference numbers are repeated for consistency. The cylinder may also be a single layer or, as shown, a multiple layer laminate.

In the cylindrical approach of the release layer 100 (or even with the folded sheet approach), there tends to be more issues with air entrapment within the cylinder when folding the cylinder to produce the dead folds and insertion of such folded cylinder via a lamination process. Thus, the cylinder may be formed, in some approaches, out of perforated materials or films to aid in the release of any entrapped air.

As shown, only a few perforations 138 are illustrated in FIG. 4a, but it will be appreciated that the perforations may be one or more, or in some cases, a plurality of slit lines, pin holes, micro-perforations, gaps, openings, and the like and any combinations thereof as needed that allow passage of sufficient air through the film so that the cylinder can be folded flat without significant air entrapment that would hinder lamination and keeping the cylinder folded flat. If the cylinder includes multiple layers, the perforations 138 may extend through all layers.

In one approach, the folded or cylindrical release layers herein include or are formed of a micro-perforated polymer film. This layer can have a plurality of micro-perforations or micro-cavities 138 formed at or on at least one surface 142 and extend into the body of the layer from the at least one surface 142 thereof. The micro-perforations may extend through the film and/or extend through multiple layers or may be a single perforated layer combined with an inner or outer air permeable layers, such as foam layer(s). The perforations 138 may be randomly spaced or distributed throughout the cylindrical layer 100 and its surface 142 and extend into and, in some cases, through the layer or layers forming the cylindrical release layer 100 (or any other layers combined with layer 100 or even any other type of release layer described herein). It will be appreciated, that the micro-perforations shown in FIG. 4a (and in the other figures) are exaggerated for illustrative purposes. The perforations may have different shapes, sizes, configurations, and spacing appropriate for a given application. As shown, the perforations generally extend inwardly to the body of layer 100 from the outer surface 142, but the perforations may also extend inwardly from the opposing side or may extend inwardly from both sides. Some perforations preferably extend all the way through the layer or layers forming the release layer 100. Other perforations may extend only partially into the body of the layer. One example of a suitable film may be from Japan Pulp & Paper (Dusseldorf, Germany). In some approaches, the layer 100 may have an oxygen transmission rate (OTR) as measured by ISO 15105-2/DIN 53380-3 of about 5,000 $cm^3/(m^2 \times day \times 1$ bar) or greater (about 23° C., about 0% relative humidity). In other cases, the OTR is about 12,000 to about 15,000 $cm^3/(m^2 \times day \times 1$ bar) and, in other cases, about 12,500 $cm^3/(m^2 \times day \times 1$ bar) or greater. The layer 100 may also have a water vapor transmission rate (WVTR) as measured by ISO 15106-3 at about 38° C. and about 90%/0% relative humidity of about 150 to about 250 $g/(m^2 \times day)$, and in other approaches, about 200 to about 250 $g/(m^2 \times day)$, and in yet other approaches, about 226 to about 227 $g/(m^2 \times day)$.

In one approach, the micro-perforated polymer film is a polyester layer, such as PET, which provides a suitable stiffness as well as the passage of air through the various perforations. By one approach, the polyester layer may be about 5 to about 23 microns thick, and in other approaches, about 10 to about 20 microns thick, and in yet other approaches, about 10 to about 12 microns thick. The polymer layer used for the release layers herein may have a tensile strength in a machine and/or cross-web direction of about 10 to about 20 kg/mm2 and in some approaches may have a machine direction tensile strength greater than a cross-web direction tensile strength. The layer may also have, in some approaches, an elongation at break from about 20 to about 25 percent, in other approaches, about 10 to about 21 percent, and in yet other approaches, about 14 to about 21 percent. In some cases, the elongation at break may be greater in the machine direction than in the cross direction.

In FIG. 4b, the release layer or sheet 100 may approximate cylindrical material, but may not be joined into a cylinder, but be wrapped or folded back over itself so that ends of a sheet of material may abut each other, but not be joined into a continuous or integral tube. In this approach, the adjacent ends of the wrapped film form a gap 139 or other spacing that also permits entrapped air release from inside the wrapped release layer 100 upon folding or lamination. Again, the wrapped (but not tubular) release layer 100 of FIG. 4b may include any of the single or multiple layers as previously discussed and may further include the holes, pinholes, slits, perforations, micro-perforations and the like.

FIG. 4c illustrates yet another approach of a release layer or sheet 100 suitable for the various tabbed sealing members described herein. In this approach, the release layer 100 is a non-continuous (or non-integral) cylindrical release layer formed out of two separate sheets or films that are welded, heat sealed, or otherwise bonded at opposing ends 136b. This approach may include or be formed out of any of the previously described single or multi-layer films or materials described for the release layers herein.

Figure 5:
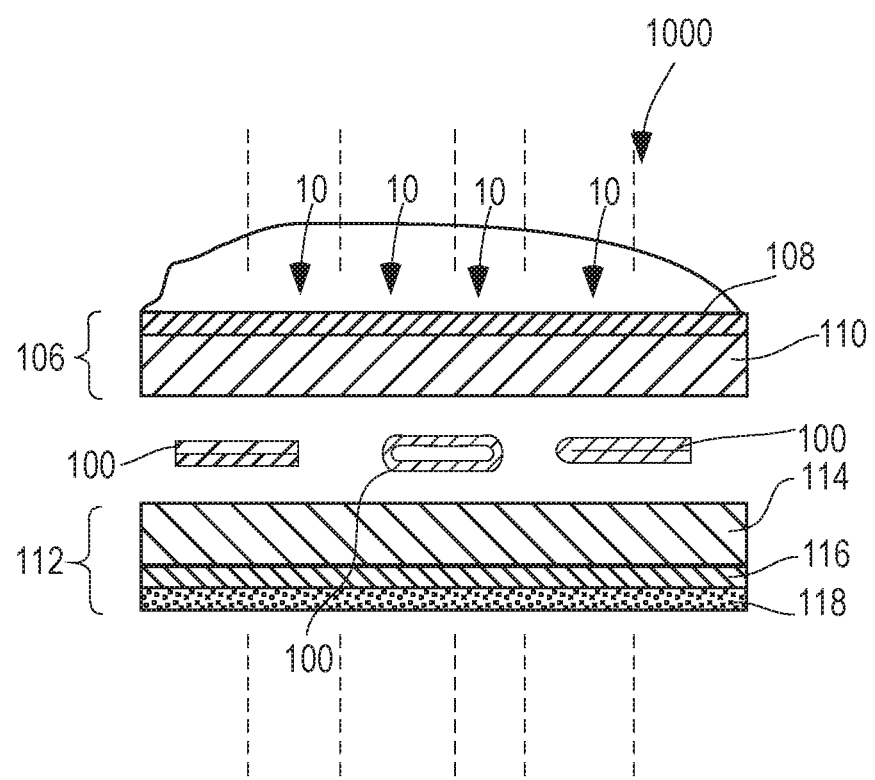
FIG. 5 is a cross-sectional view of a laminate sheet configured to have tabbed sealing members die cut therefrom with exemplary spaced release layers positioned therein.
Figure 6:
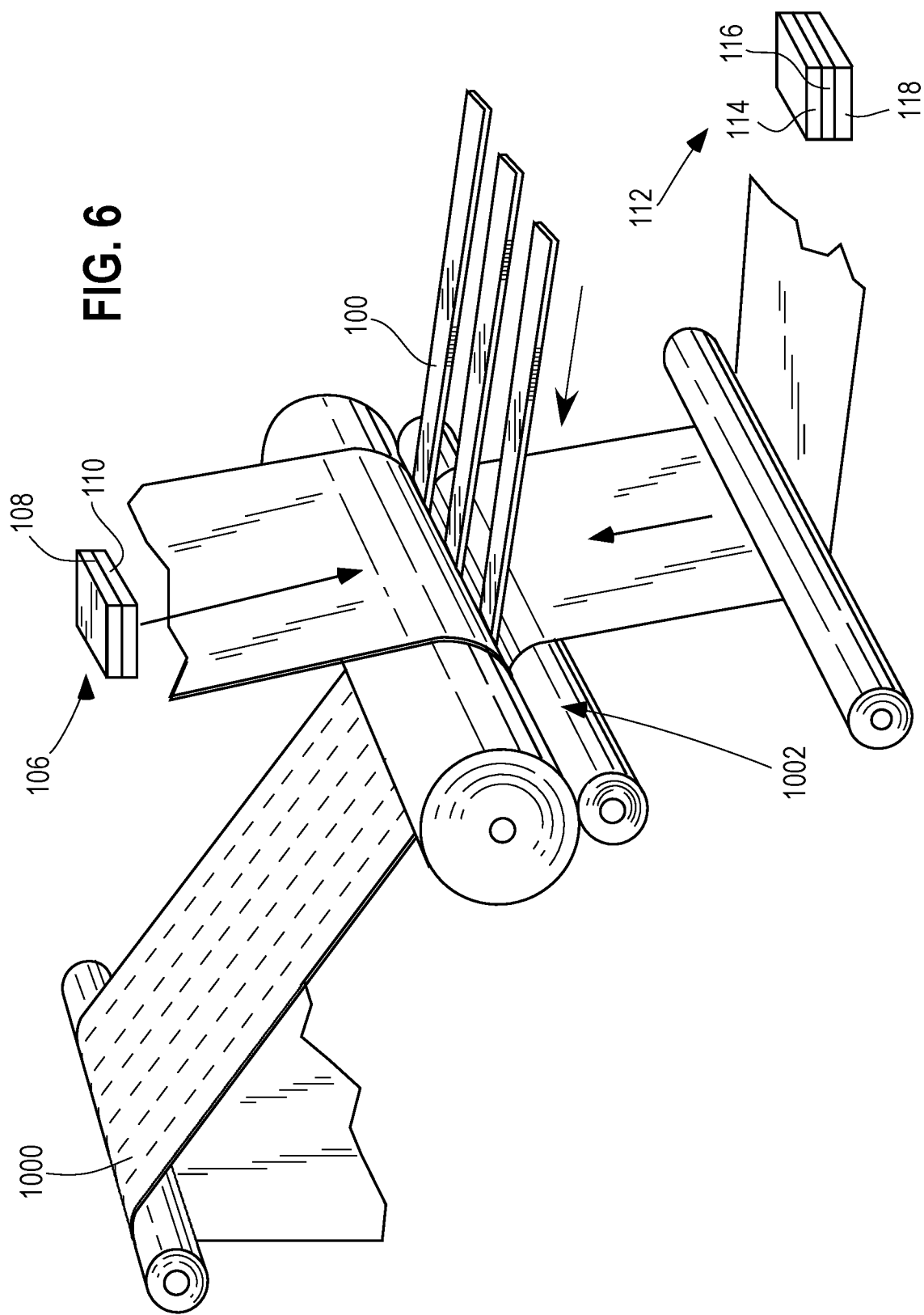
FIG. 6 is an exemplary method of making the laminate sheets of the present disclosure.

Turning to FIGS. 5 and 6 for a moment, exemplary laminate sheets 1000 and methods of making such laminates 1000 are provided using the folded, wrapped, or cylindrical release layers 100 shown in the previously discussed figures. In FIG. 5, the various release layers 100 are shown inserted in a laminate of layers designed to form tabbed sealing members 10 (that is, typically from FIG. 1 and the other Figures herein). Here, the release layer 100 is shown generically, but three of the different types of release layers from FIGS. 2, 3, and 4 are shown in the same laminate (folded and welded from FIG. 3b on the left, cylindrical of FIG. 4a, b, or c in the middle, and folded of FIG. 3a on the right) for exemplary purposes, but it will be appreciated that such release layer types will typically not be mixed within the same laminate 1000. Usually only a single type of release layer will be used at one time. FIG. 5 is intended to illustrate the insertion of various types of release layers 100 within the laminate 1000 and the release layer 100 in FIGS. 5 and 6 may be any of the folded, wrapped, or cylindrical layers 100 previously described. Tabbed sealing members may be die cut from the sheet 1000 using conventional technology as indicated by the hashed die cut lines. It will be appreciated that any of the tabbed sealing members herein may be formed using the sheet 1000 of FIG. 5 and process of FIG. 6 by varying the construction of the layers within the laminate sheet.

FIG. 6 shows the various release layers 100 after being folded, slit, or wrapped and being directed into a nip 1002 where the various layers of upper laminate 106 and lower laminate 112 are also brought together to form an assembled laminate sheet 1000. In some approaches, the various release layers 100 may be formed via the perforated, slit, holed, gaped, or micro-perforated film mentioned above; thus, as the layers 100 enter the nip 1002, entrapped air between the upper and lower portions of the release layers may escape through the film to allow ease in keeping the release layer 100 flat, folded, and substantially free of wrinkles at the nip. As the various materials forming the release layer 100 may include adhesive or heat bondable material on outer surfaces, as the release layer 100 enters the nip 1002 with the other layers 106 and 112, the release layer will then be bonded to the layers above it and the layers below it upon application of heat. The nip may be heated if heat bondable materials are used. There may be a release coating on the inner surfaces of the release layer 100 so that the release layer inner surface of the top part 102 does not adhere to the release layer inner surface of the bottom part 104.

Figure 7:
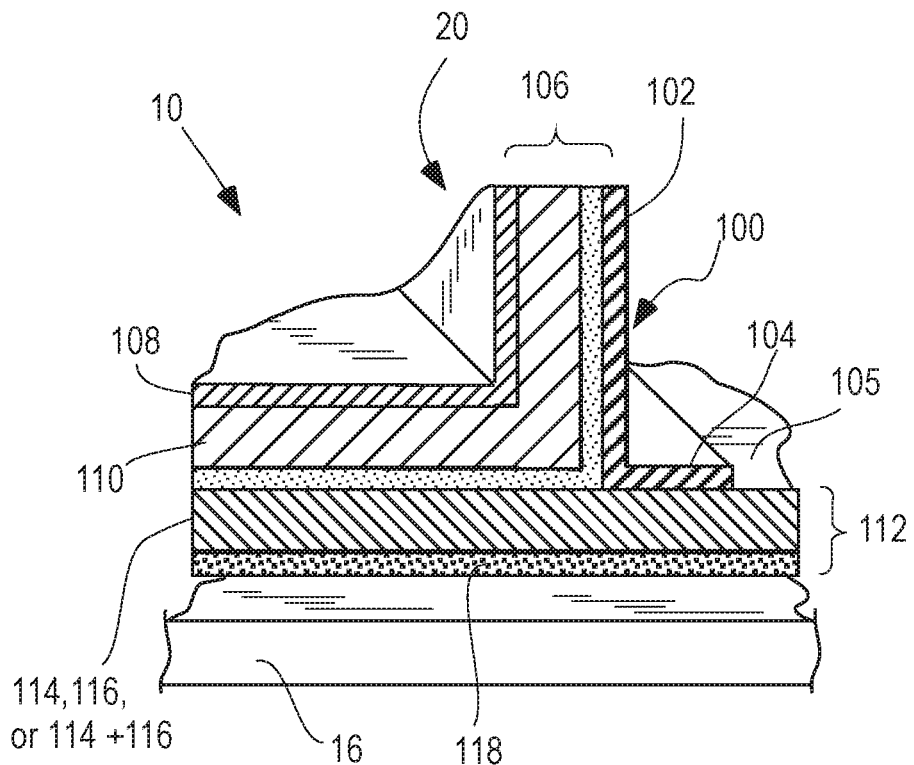
FIG. 7 is a cross-sectional view of a tabbed sealing member including a non-symmetrical folded release layer where a top part of the release layer is longer than a bottom part of the release layer.

Turning to FIG. 7, another exemplary tabbed sealing member 10 is shown. In this approach, the release layer includes a similar folded layer 100 as those previously described, but in this approach, the upper folded layer part 102 is longer than the lower folded layer part 104 to form a non-symmetrical release layer. In this approach, the lower folded layer part 104 does not have an outer edge that meets and ends with an outer edge or periphery of the lower laminate part 112. That is, there is a gap or space 105 between the outer edge of the lower release layer part 104 and the edge or periphery of the laminate 112 where an upper surface of the lower laminate 112 is exposed and visible. This gap 105 can create a small space or other fingernail gap so that a user can more easily pivot up the tab in use. Here, the non-symmetrical release layer 100 (that is, the top part is longer than the bottom part) may also be any of the previously discussed materials described as suitable for the release layer and may be either a single or multi-layer film or laminate and can be formed from the folded, wrapped, or slit cylindrical release layers. Also, the remaining layers in the laminate shown in FIG. 7 are not particularly limited and the non-symmetrical release layer may be incorporated into any of the tabbed sealing members described in this disclosure. It will be appreciated that the non-symmetrical release layer 100 may also have a shorter upper part 102 and a longer lower part 104.

Figure 8:
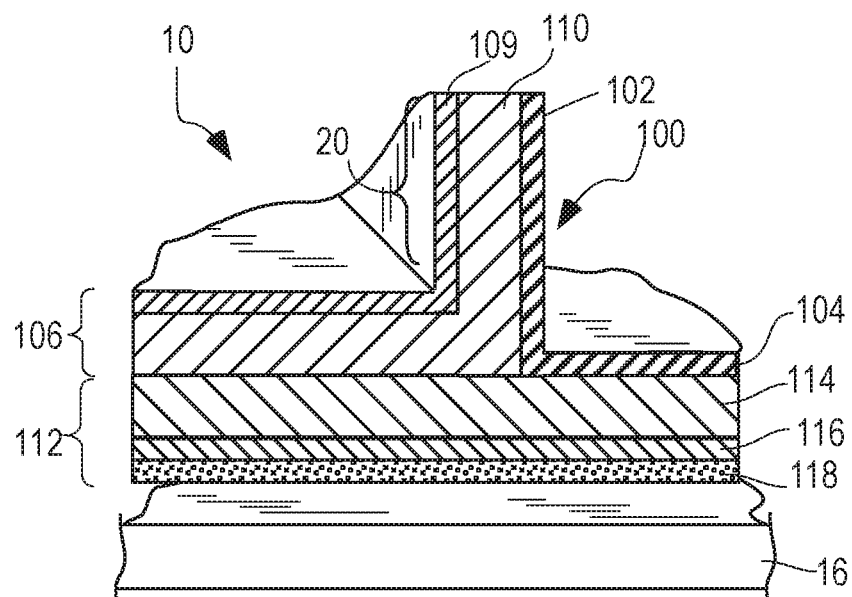
FIG. 8 is a cross-sectional view of a tabbed sealing member including a top foam layer.
Figure 9:
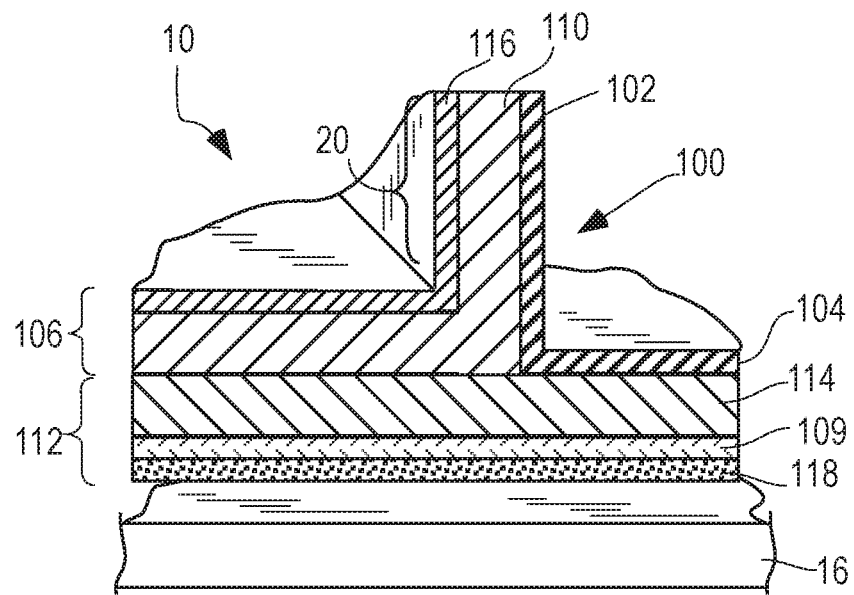
FIG. 9 is a cross-sectional view of a tabbed sealing member including a foamed or non-foam insulation layer positioned underneath a foil layer.
Figure 10:
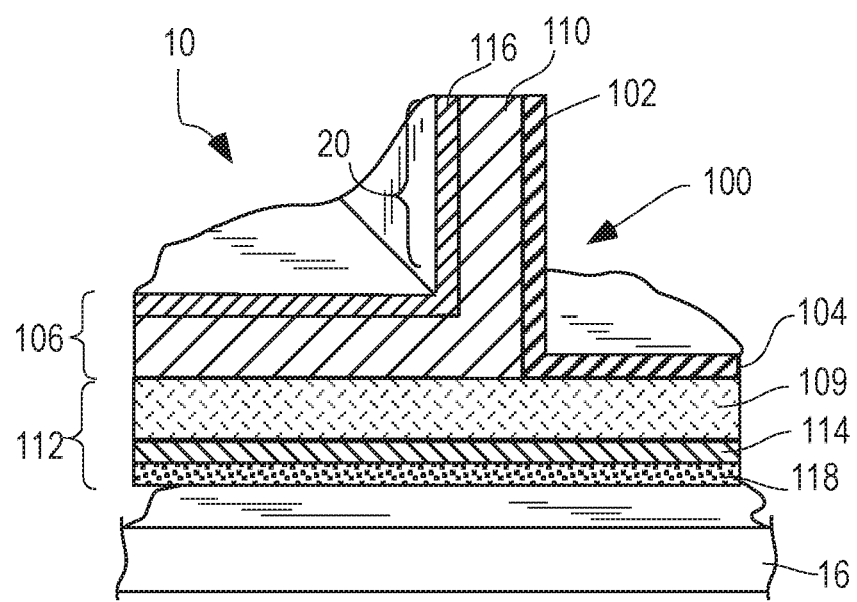
FIG. 10 is a cross-sectional view of a tabbed sealing member including an insulation layer, which can be foamed or non-foamed, above the foil but below the various release layers described herein.

FIGS. 8-10 show an exemplary tabbed sealing members with any of the previously discussed release layers 100 and show different embodiments or versions of tabbed seals. It will be appreciated by those of ordinary skill that the particular structures in these figures are not mutually exclusive and any layer in these figures and be used and interchanged with other layers in the other embodiments. It will also be appreciated that the inclusion of a particular release layer 100 or sheet in an individual Figure does not mean that the particular construction of the tabbed sealing member of such Figure is limited to such release layer. Any of the release layers herein can be used with any of the laminate structures of this disclosure. In these approaches, the layers in the assembly may vary as needed for a particular application. For example, a foamed polymer or non-foamed polyolefin insulation layer 109 (such as that described in U.S. Pat. No. 8,057,896, which is incorporated herein by reference) may be provided in various locations within the laminate to provide desired insulation and heat redirection as needed for a particular application. As discussed below, a polymer foam is used for simplicity in the embodiments, but this layer could also be the non-foamed heat redistribution polyolefin layer as described in the above noted '896 patent.

More specifically and in the approach of FIG. 8, the top layer of the tabbed seal may be the foamed or non-foamed insulation layer 109. For instance, layer 109 may be a top foam layer, layer 110 may be a heat bondable or adhesive layer (such as EVA or the like), layer 100 may be any of the above described release layers, layer 114 may be foil, layer 116 is optional and may be a polymer support layer such as, but not limited to, PET, PEN, nylon and the like, and layer 118 may be a heat seal or pressure sensitive adhesive layer. The seal 10 is bonded to a container rim 16.

FIG. 9 is an alternative approach of a tabbed seal 10 with the insulation layer 109 (foam or non-foamed) underneath the foil layer 114. In this approach, the top layer of the seal is the polymer support layer 116. The other layers are similar to the previous figures.

FIG. 10 shows another approach or embodiment with the foamed or non-foamed polymer insulation layer 109 above the foil 114 and underneath the release layer 100 so that the bottom part 104 of the release layer is not directly bonded to the foil layer 114, but rather directly bonded to the insulation layer 109. The remaining layers of this approach may be similar to those previously described.

FIG. 11 shows yet another approach or embodiment using a segmented configuration. In this approach, a segmented layer 200 is included adjacent to or abutting the release layer 100 (any preferably within the same laminate plane when the tab is folded down) to help provide more even and consistent pressure and thickness between the tabbed and non-tabbed sides of the seal. As the various folded, wrapped, and cylindrical release layers 100 tend to be thicker due to the top and bottom parts 102 and 104 (when folded together), there tends to be a thickness variation between the left and right sides of the seal. To help address this thickness unevenness, the seal 10 may include a segmented layer 200 above the top layer of the lower laminate 112, which may be layer 109, 114, or 116 (foil, foam, polymer as the case may be) to help even out the thickness. Segmented layer 200 may be a polymer layer such as PET, polyolefin, nylon, and combinations thereof that extends partway across the seal and covers areas of the seal that the release layer 100 does not. Thus, the combination of the segmented layer 200 and release layer 100 would cover the entire seal and the thickness of the segment layer and release layer 100 would be consistent and/or the same when combined in the laminate. The segmented layer 200 may have a thickness that is the same as or consistent to the combined thickness of the top part 102 and lower part 104 of the release layer 100. As used herein, consistent to is within about +/−5 to 10 percent.

In yet another approach, the tabbed sealing member may be any of the previously discussed configurations, but without any foil layer or other induction heatable layer. This type of seal could be constructed and/or sealed to a container using conduction heat or directly heating the container surface rather than via induction heating.

FIG. 12 shows an alternative tabbed sealing member 10 where the foil layer 114 is moved to alternative locations as needed for unique applications. For example, the foil or any induction heatable layer 114 may be moved from the lower laminate 112 (as generally shown in the previous configurations) up into the upper laminate 106. In this form, the folded, wrapped, or slit cylindrical release layer 100 may be below the foil within the final laminate structure. More specifically, FIG. 12 shows an example of this configuration with an optional foil layer 114 above the release layer 100 and positioned within in the upper laminate 106 and in the formed tab. Alternatively, the release layer 100 may also be included under any of the layers in the lower laminate 112 as needed for a particular application. For example, the release layer 100 may be below insulation layer 109 or below support layer 116 within the laminate shown in FIG. 12. If needed, the lower laminate 112 of FIG. 12 may also include a second foil layer in the lower laminate (not shown) so that the construction includes a dual foil assembly with a foil in the upper laminate 106 and a foil layer in the lower laminate 112. If used, this second foil layer may be between any of the layers in the lower laminate 112 or form the top surface of lower laminate 112

Figure 13:
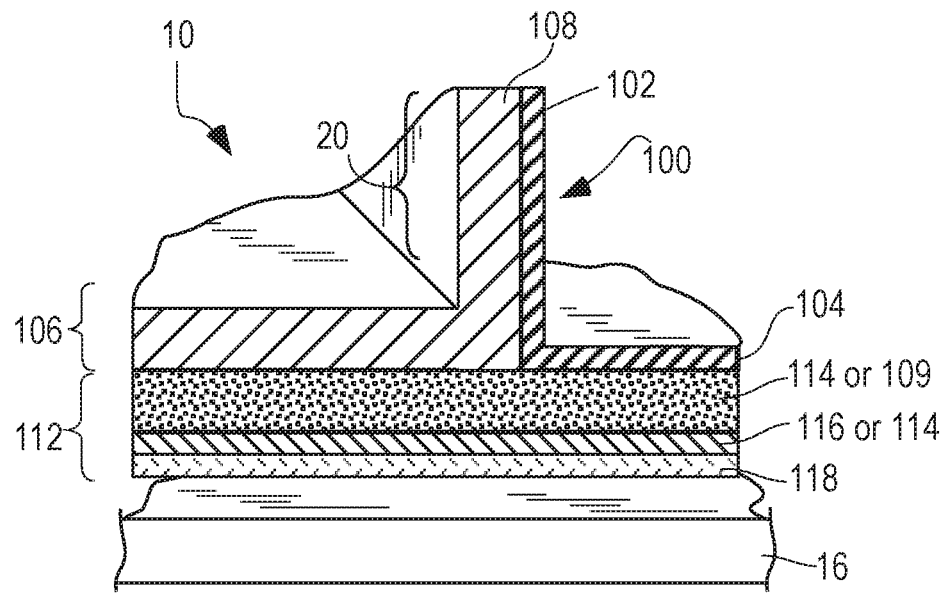
FIG. 13 is a cross-sectional view of a tabbed sealing member including the various release layers herein directly bonded to the top polymer support layer.

The folded, wrapped, or cylindrical release layer 100 may also be directly bonded to the top layer (such as layer 108) of the upper laminate 106. This is exemplified in FIG. 13 where the top folded part 102 of the folded, wrapped, or cylindrical release layer 100 is directly bonded to the upper polymer support layer 108. Here, layer 108 may also be direct bonded to the lower laminate 112 as needed via adhesive or other bonding methods, such as by using any of the multi-layer structures shown in FIGS. 3 and 4 as layer 108 in an unfolded state, which would enable direct bonding of layer 108 to the layers below it. In this form, layer 108 may be a PET/EVA combination or the release layer may be an EVA/PET folded, wrapped, or cylindrical material.

Figure 14:
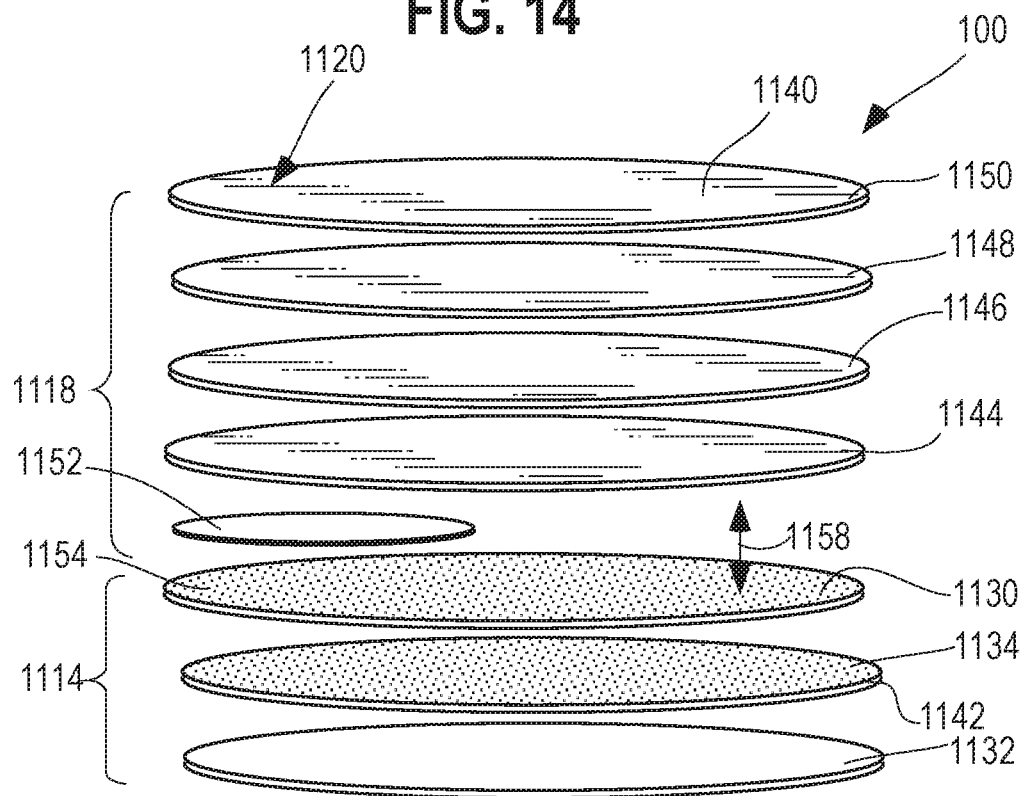
FIG. 14 is an alternative tabbed sealing member including no release layer, but a partial layer of a meltable material that is absorbed into an absorbent layer to form the tab.
Figure 15:
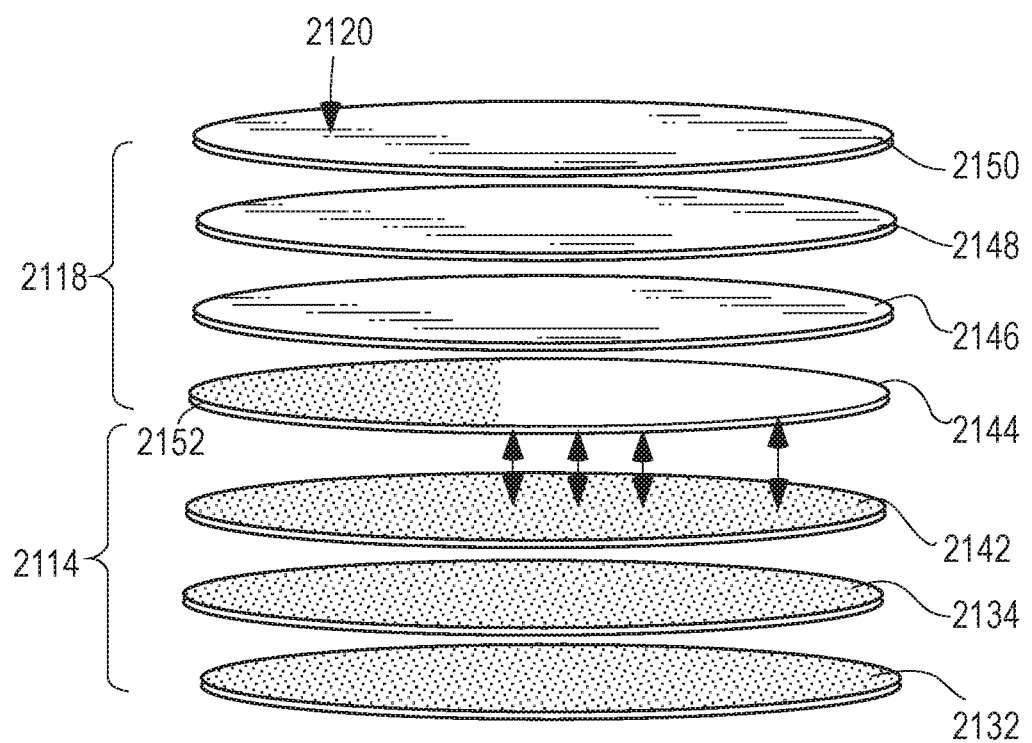
FIG. 15 is an alternative tabbed sealing member including a layer with a segmented debonding or slip agent provided in only portions of the layer configured to form a tab.

Turning now to various alternatives of forming a tabbed sealing member, the construction of FIGS. 14-15 provide tabbed sealing members without any of the previously described release layers. In these approaches, various types of transformable release materials, such as wax, talc, calcium carbonate, slip agents, polyethylene glycol (PEG), or polypropylene glycol (PPG) and the like may also be used to hinder or prevent the top laminate 1118 or 2118 from bonding to the lower laminate 1114 or 2114 to form a gripping tab 1120 or 2120 even without the use of a previously described release layers.

In FIG. 14, a tab 1120 may be formed via a part layer, which is shown initially as layer 1152, but this part layer 1152 melts or flows during induction heating to be absorbed by the layer below or above it. For example, layer 1152 may be wax, PEG, or PPG and layer 1142 directly below it (or a layer directly above) may be any absorbent layer or material that is configured to absorb the melted or flowable layer 1152 after induction heating. Thus, layer 1142 may be a paper layer, a foam layer, or any absorbent polymer layer. Layer 1142 may also be or include synthetic fibers, either aligned or intertwined. An example may be SynthaSeal™ material. Thus, no defined release layer is formed in the final, resultant seal after heat sealing, but the material forming layer 1152 is present during initial seal handling and formation and this layer melts and is absorbed into the layer below it (or above it) during induction sealing to then form the tab, shown here as layer 1120. It will be appreciated in this approach that portions of the seal shown as the bond 1158 are bonded or secured together and the layers above 1152 are bonded together and form the tab 1120 (that is portions of laminate 1118 above layer 1152 are not bonded to portions of laminate 1114 below it to form the tab). The tab 1120 can be pivoted upwardly similarly to that depicted in FIG. 1.

Other exemplary layers in the approach of FIG. 14 may be an upper polymer support 1150 (PET, PEN, Nylon, polyolefin, and copolymers thereof), and optional polymer layers 1148 and 1146 (either may be a foamed or non-foamed polymer layer to provide insulation, support and/or redirect heat as needed; either may be any of the foamed polymers or the non-foamed polymer heat-redistribution layers as discussed above). Layer 1144 may be a heat bondable layer, such as EVA or EMA. Layer 1134 may be foil, and layer 132 may be a heat seal or PSA. The structure may also include a barrier layer as needed.

The wax, PEG, or PPG material 1152 may be lanes or strips of material that are coated on the upper surface of the lower laminate 1114 or the lower surface of upper laminate 1118. Using FIG. 6 as a reference, the release layers 100 in the prior approach may be replaced with wax, PEG, or PPG coated lanes applied to either web 108 or web 112 prior to the lamination station 1002.

It will be appreciated that the wax, PEG, or PPG is shown in FIG. 14 applied to the upper laminate 1118 with the absorbent layer 1142 in the lower laminate 1114. This can be reversed with the absorbent laminate 1142 in the upper laminate and the wax, PEG, or PPG applied to the lower laminate.

Alternatively, the part-layer of material represented as element 1152 in FIG. 14 may be a talc or calcium carbonate applied to either the upper laminate or the lower laminate to prevent the tab portion 1120 of the upper laminate from bonding to the layer below it. Similar to the wax-type applications, the talc or calcium carbonate may be applied in lanes or bands to either the upper laminate or the lower laminate in strip or part layers corresponding to the tab in the final product. The talc or calcium carbonate is positioned underneath where the tab is designed to be formed and only applied on part of the seal, such as the parts corresponding to area 1152 in FIG. 14 for example. The talc or calcium carbonate prevent or hinders the tab portions in the upper laminate 1118 from bonding to the lower laminate portions 1114 underneath the tab.

FIG. 15 shows yet another alternative approach of forming a tabbed sealing member without a release layer. In this approach, the lower layer 2144 in the upper laminate 2118 is a film layer having a modified or segmented debonding agent, such as a modified slip agent, blended therein as shown by the area 2152 in the Figure. The debonding or slip agent 2152 is only partially provided in the film 2144 corresponding to area 2152 of the tab. In one exemplary use, the debonding or slip agent blooms to the surface (such as the lower surface of top laminate 2118) and substantially prevents the film surface 2144 from bonding to the layers below it, which then forms a tab 2120. By one approach, the debonding or slip agents are fatty acid amides, silica, talc, calcium carbonate, erucamide, and/or oleamide, and combinations thereof.

The tabbed sealing member of FIG. 15 may also include other layers. Those shown in FIG. 15 are only exemplary and can vary. For example, the seal may include an upper polymer support 2150 (PET, PEN, nylon, polyolefin), and optional polymer layers 2148 and 2146 (either may be a foamed or non-foamed polymer layer to provide insulation, support, or redirect heat as needed; either may be any of the foamed polymers or the non-foamed heat-redistribution layers as discussed previously). Layer 2144 may be a heat bondable polymer film (EVA, EMA, polyolefins, etc.) with the segmented debonding or slip agent 2152 as described above. In the exemplary lower laminate, layer 2142 is an optional polymer film (PET, PEN, nylon, polyolefin, etc.), a polymer foam, or a non-foamed heat-redistribution layer as mentioned previously. Layer 2134 may be foil, and layer 2132 may be a heat seal layer or pressure sensitive adhesive (PSA).

It will be appreciated that the sealing members described herein, in some cases, function in both a one-piece or two-piece sealing member configuration. A one-piece sealing member generally includes just the sealing member bonded to a container rim. A cap or closure may be also used therewith. A two-piece sealing member includes the sealing members discussed herein temporarily bonded to a liner. In this construction, the sealing member is bonded to a container's rim, and the liner is configured to separate from the sealing member during heating to be retained in a cap or other closure used on the container. In a two-piece construction, a wax layer, for example, may be used to temporarily bond an upper surface of the sealing member to the liner. During induction heating, the wax layer melts and is typically absorbed into the liner. Thus, the liner separates from the sealing member. The liner then generally stays in the cap, and the sealing member generally stays adhered to the container rim. Other types of releasable layers (other than wax) may also be used to provide a temporary bond between the seal and liner. Any of the exemplary tabbed sealing members herein may also be combined with a liner that is wax bonded to the top surface of the tabbed sealing member. In some cases there may be a paper layer as the top layer in the lower laminate, and it absorbs the wax, and the liner is a foam.

Examples of such two-piece assemblies are provided in FIGS. 16 and 17 showing a two-piece tabbed sealing member 10 with a wax layer 90 bonded to an absorbent liner 92. It will be appreciated that any of the tabbed sealing members herein can be configured in this manner and the structure in FIG. 16 is not limiting and only exemplary. FIG. 17 also shows yet another form of a tabbed sealing member using the previously described folded, wrapped, or cylindrical release layer 100 with no other upper laminate layers (other than one of the release layers 100 herein) so that the upper part 102 of the release layer 100 forms the tab 20 with no other structure. In the approach of FIG. 17, it is shown as a two-piece seal and liner, but it will be appreciated that the tabbed seal of FIG. 17 can also be used without the liner and wax bond. The release layer 100 in this approach may include any of the features previously discussed with FIGS. 2, 3, 4, 5, and 7.

The tabbed seal of FIG. 17 may also include a foamed polymer or a non-foamed heat distributing layer underneath the release layer 100 and above the foil 114. This alternative structure is shown in FIG. 17a. In FIGS. 16, 17, and 17a, the other layers are consistent to those previously described and, thus, not discussed further here.

Figure 18A:
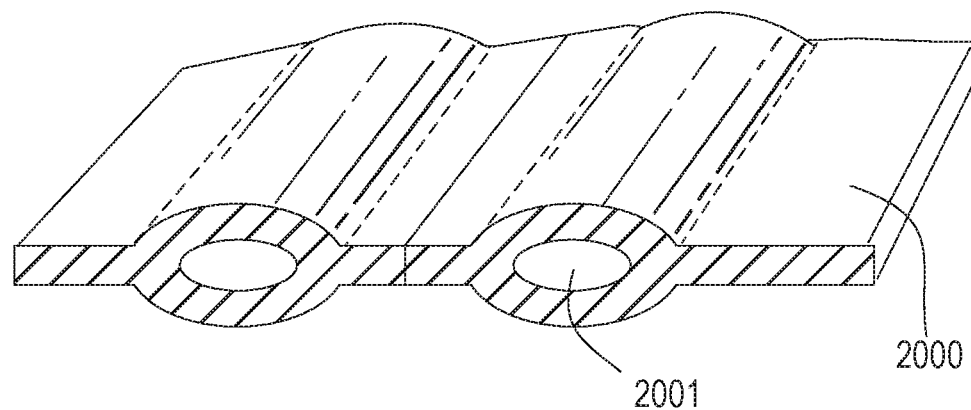
FIG. 18a is an extruded film having spaced pockets extruded therein.
Figure 18B:
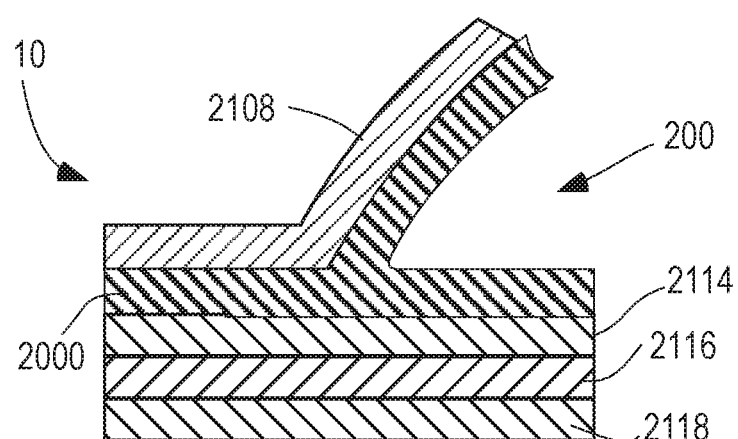
FIG. 18b is a cross-sectional view of a tabbed sealing member including the extruded film of FIG. 18a utilizing the pocket thereof to form the tab.

FIG. 18a shows yet another exemplary approach for forming a release member or layer 100 suitable for any of the tabbed sealing member constructions of this disclosure. Here, a film 2000 is formed that includes extruded and integrally defined cavities 2001 within the extruded film. The cavities 2001 may be bubbles, airpockets, voids, and the like spaced about the polymer film. The pockets 2001 may extend transversely or longitudinally across the film in lanes or bands. The film 2000 of FIG. 18a may then be inserted into a laminate sheet, such as sheet 1000 in place of the release layer 100, and when die cut, forms the tabbed sealing member of FIG. 18b. When the tabbed sealing member is die cut, it will result in the exemplary tabbed sealing member or laminate. The laminate of FIG. 18b may include a polymer support 2108 (PET, PEN, nylon, or polyolefin), a foil 2114, an optional polymer layer 2116, and a heat seal or PSA 2118. However, it will be appreciated that any of the tabbed sealing members described herein may use the cavity release layer film 2000 in place of the previously discussed release layer 100.

Figure 19:
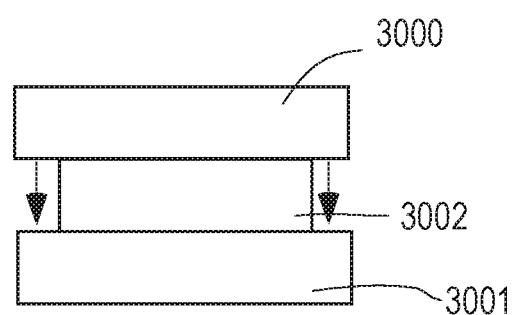

FIG. 19 shows another laminate including a PET 3000 bonded to EVA 3001 with a spacer layer 3002 positioned therebetween. In this approach, the PET and EVA are bonded together on opposite sides of the spacer layer. The spacer layer is not bonded to one of the PET or EVA.

Turning to more details of the various layers set forth in the examples above, any of the mentioned structural polymer layers (such as 108, 116, 130, 1150, 1148, 1146, 2146, 2150, 2148, 2142) may be polyethylene terephthalate (PET), polyethylene naphthalate (PEN), nylon, or other structural polymer layer and may be, in some approaches, about 0.5 to about 5 mils thick, and in other approaches, about 1 to about 3 mil thick. In other approaches, these layers may be non-foamed polyolefin polymers. The polymer support layers can be selected from a variety of suitable non-foamed polymer materials that are capable of providing structural support at a relatively thin thickness. For example, the polymer materials may be uni-axially oriented polymers or bi-axially oriented polymers, such as uni-axially oriented polypropylene and bi-axially oriented polypropylene. The support layers may also be copolymers and/or blown film layers. By one approach, the support layer may be oriented in a cross-web direction only. In some approaches, these axially oriented polymers may have a modulus of elasticity in a longitudinal direction of greater than about 2,000 N/mm$^2$. In other cases, the film may have a modulus of elasticity in a cross-direction of about 4,000 N/mm$^2$ or greater. Some films may be bi-axially oriented and have both the longitudinal and cross-web modulus of elasticity mentioned above.

There may also be adhesive layers (not shown in the figures) that bond various layers together. For instance, thin adhesive layers (not shown) may also be used to secure layers together as needed for a particular application, and may be, for example, about 0.2 to about a 0.5 mil (or less) adhesive, such as a coated ethylene vinyl acetate (EVA), polyolefins, 2-component polyurethane, ethylene acrylic acid copolymers, curable two part urethane adhesives, epoxy adhesives, ethylene methacrylate copolymers and the like bonding materials.

The laminates may also include a polymer foam layer, such as layers 109, 1148, 1146, 2148, or 2146. For example, the polymer foam may be a polyethylene foam layer. Other suitable polymer foams include polypropylene or propylene-ethylene copolymers. Polyethylene foam is preferred because of desired bonding behavior and bond strength to the foil layer. The thickness of any foam layer may be at least about 0.003 inches, more preferably at least about 0.005 inches and, in some approaches, about 0.003 to about 0.010 inches. If the thickness is too thin, the heat from the induction sealing process can melt the foam. Also, the desired bond strength might not be achieved. Furthermore, if the foam is too thin, it will provide less compression and the bond achieved via induction heating can become less reliable. When the foam is thicker than about 0.010 or even 0.008 inches, the benefits begin to stop and material's cost and bulkiness can present problems in the context of an induction bonding process. In some forms, the polymer foam layer may have an internal rupture strength of about 2000 to about 3500 g/in. In some approaches, the foamed polymer layer may also have a density less than 0.6 g/cc and, in some cases, about 0.4 to less than about 0.6 g/cc. In other approaches, the density may be from about 0.4 g/cc to about 0.9 g/cc. In other approaches, the foamed polymer layer may be about 1 to about 5 mils thick.

The tabbed seals may also include non-foamed heat redistribution or heat distribution layers, which may be layers 109, 1148, 1146, 2148, or 2146. The non-foam heat distributing layer may be a non-foam heat distributing polyolefin film layer. By one approach, the non-foam heat distributing polyolefin film layer is a blend of polyolefin materials, such as a blend of one or more high density polyolefin components combined with one or more lower density polyolefin components. Suitable polymers include but are not limited to, polyethylene, polypropylene, ethylene-propylene copolymers, blends thereof as well as copolymers or blends with higher alpha-olefins. By one approach, the non-foam heat distributing polyolefin film layer is a blend of about 50 to about 70 percent of one or more high density polyolefin materials with the remainder being one or more lower density polyolefin materials. The blend is selected to achieve effective densities to provide both heat sealing to the container as well as separation of the liner from the seal in one piece.

By one approach, effective densities of the non-foam heat distributing polyolefin layer may be between about 0.96 g/cc to about 0.99 g/cc. Above or below this density range, unacceptable results are obtained because the layer provides too much insulation or does not effectively distribute heat. By another approach, the non-foam heat distributing layer is a blend of about 50 to about 70 percent high density polyethylene combined with low to medium density polyethylene effective to achieve the density ranges described above.

In addition, effective thicknesses of the non-foam heat distributing layer are selected to achieve such performance in combination with the density. One approach of an effective thickness may be about 2 to about 10 mils. In other approaches, such layer may be about 2 to about 5 mils thick, in other approaches, about 2 to about 4 mils thick, and in yet other approaches, about 2 to about 3 mils thick. Thicknesses outside this range were unacceptable because the layer does not provide enough insulation or does not effectively distribute heat as needed to achieve the dual performance characteristics of liner separation and seal member bonding.

Suitable adhesives, hot melt adhesives, or sealants for the lowermost heat sealable layer (such as, layers 118, 1132, 2118, 2132) may include, but are not limited to, polyesters, polyolefins, ethylene vinyl acetate, ethylene-acrylic acid copolymers, surlyn, and other suitable materials. By one approach, the lowermost heat sealable layer may be a single layer or a multi-layer structure of such materials about 0.2 to about 3 mils thick. By some approaches, the heat seal layer is selected to have a composition similar to and/or include the same polymer type as the composition of the container. For instance, if the container contains polyethylene, then the heat seal layer would also container polyethylene. If the container contains polypropylene, then the heat seal layer would container polypropylene. Other similar materials combinations are also possible.

By one approach, any membrane or foil layer, (such as layers 114, 1134, 2114, or 2134) may be one or more layers configured to provide induction heating and barrier characteristics to the seal. A layer configured to provide induction heating is any layer capable of generating heat upon being exposed to an induction current where eddy currents in the layer generate heat. By one approach, the membrane layer or foil layer may be a metal layer, such as, aluminum foil, tin, and the like. In other approaches, the membrane layer may be a polymer layer in combination with an induction heating layer. The membrane layer may also be or include an atmospheric barrier layer capable of retarding the migration of gases and moisture at least from outside to inside a sealed container and, in some cases, also provide induction heating at the same time. Thus, the membrane layer may be one or more layers configured to provide such functionalities. By one approach, the foil or membrane layer is about 0.3 to about 2 mils of a metal foil, such as aluminum foil, which is capable of providing induction heating and to function as an atmospheric barrier.

The bonding layer or heat-activated bonding layers (e.g., 110, 1144, 2144, and 3001) may include any polymer materials that are heat activated or heated to achieve bonding characteristics. By one approach, the heat-activated bonding layer may have a density of about 0.9 to about 1.0 g/cc and a peak melting point of about 145° F. to about 155° F. A melt index of the bonding layer may be about 20 to about 30 g/10 min (ASTM D1238). Suitable examples include ethylene vinyl acetate (EVA), ethylene methyl acrylate (EMA), polyolefins, 2-component polyurethane, ethylene acrylic acid copolymers, curable two-part urethane adhesives, epoxy adhesives, ethylene methacrylate copolymers, combinations thereof, and the like bonding materials.

By one approach, the heat-activated bonding layer is EVA. In general, EVA is effective for the heat-activated bonding layer because of its thermal bonding characteristics, such that it readily bonds to layers and forms a bond thereto greater than the internal rupture strength mentioned above. By one approach, the heat-activated bonding layer may have a vinyl acetate content of about 20 to about 28 percent with the remaining monomer being ethylene in order to achieve the bond strengths and, in some cases, the internal rupture strengths to provide the improved seals herein. A vinyl acetate content lower than 20 percent is insufficient to form the robust structures described herein. As described above, the heat-activated bonding layer may have a selected thickness relative to the total thickness of the upper laminate to help achieve functionality of the seal. If the heat-activated bonding layer is too thick when the foamed polymer layer is positioned above it, it becomes difficult to achieve satisfactory bonds and there is too much volume or mass of the heat-activated bonding layer that tends to ooze out from the seal upon later induction or conduction heating. If the heat-activated bonding layer is too thin, the bond strengths to the lower laminate can be inadequate resulting in the tab peeling away from the lower laminate upon seal removal. If the bonding layer is too thin, then the tab also does not have the sufficient internal strength to prevent tearing. By one approach, bonding layer may be about 0.5 to about 2 mils, in other approaches, about 0.5 to about 1.5 mil and, in other approaches, about 0.5 to about 1.0 mils; however, the thickness can vary as needed for a particular application to achieve the desired bonds and internal strength.

The various layers of the sealing member are assembled via a heat lamination process forming a sheet of the described layers. Adhesive coating and/or extrusion lamination may also be used. During lamination, heating is applied to the web in order to activate the various heat-activated layers in the laminate structure in order to form the sealing member. The resulting laminate sheet of the sealing members can be cut into appropriate sized disks or other shapes as needed to form a vessel closing assembly or tabbed sealing member. The die cut generally cuts through the various release layers 100 so that the release layer forms the gripping tab. The cut sealing member is inserted into a cap or other closure which, in turn, is applied to the neck of a container to be sealed. The screw cap can be screwed onto the open neck of the container, thus sandwiching the sealing member between the open neck of the container and the top of the cap. Heat or induction current or other sealing is then applied to seal the bottom subassembly of layers forming the seal portion to the neck of the container.

It will be understood that various changes in the details, materials, and arrangements of the process, laminates, laminate/substrate assemblies, and combinations thereof, which have been herein described and illustrated in order to explain the nature of the products and methods may be made by those skilled in the art within the principle and scope of the embodied products and methods as expressed in the appended claims. For example, the laminates and assemblies may include other layers within the laminate and between the various layers shown and described as needed for a particular application. Adhesive layers not shown in the Figures may also be used, if needed, to secure various layers together. Unless otherwise stated herein, all parts and percentages are by weight.

What is claimed is:

1. A tabbed sealing member for bonding to a rim surrounding a container opening, the tabbed sealing member comprising:

a lower member including at least a seal layer for bonding to a container rim;

an upper member including one or more layers and partially bonded to the lower member and including a free portion thereof not bonded to the lower member;

a hinge joint formed by the partial bond between the upper member and the lower member, the hinge joint permitting the upper member free portion to pivot away from the lower member to form a gripping tab; and a folded sheet with a first folded portion bonded to the upper member free portion, a second folded portion bonded to a portion of the lower member below the free portion, and a dead fold aligned with the hinge joint, an inner surface of the first folded portion is not bonded to a facing inner surface of the second folded portion, wherein the folded sheet is non-symmetrical with one of the first folded portion or the second folded portion extending to a periphery of the tabbed sealing member and the other of the first folded portion or the second folded portion has a distal end spaced from the periphery of the tabbed sealing member.

2. The tabbed sealing member of claim 1, wherein the folded sheet is a polymer film including one or more polymer layers.

3. The tabbed sealing member of claim 1, wherein the folded sheet is non-tubular.

4. The tabbed sealing member of claim 1, wherein the folded sheet includes an inner polymer layer and an outer polymer layer, the outer polymer layer is a heat activated polymer forming the bond between the first folded portion and the upper member free portion and the second folded portion and the portion of the lower member below the free portion.

5. The tabbed sealing member of claim 4, wherein the inner polymer layer is polyethylene terephthalate and the outer polymer layer is one of ethylene vinyl acetate, ethylene methyl acrylate, polypropylene, polyethylene, polyurethane, and copolymers thereof.

6. The tabbed sealing member of claim 4, wherein the inner layer is a polymer with a melting point and the outer layer is a polymer having a melting point lower than the melting point of inner layer.

7. The tabbed sealing member of claim 4, wherein one of the inner folder layer or the outer folded layer is a foamed polymer.

8. The tabbed sealing member of claim 1, wherein the folded sheet includes a perforated polymer film.

9. The tabbed sealing member of claim 1, wherein the first folded portion is heat welded to the second folded portion.

10. The tabbed sealing member of claim 1, wherein the lower member includes one or more of a foil layer, a polymer support layer, a foamed polymer layer, a non-foamed heat distribution later, or combinations thereof.

11. The tabbed sealing member of claim 1, wherein the upper member includes one or more of a foil layer, a polymer support layer, a foamed polymer layer, a non-foamed heat distribution layer, a heat bonding polymer layer, or combinations thereof.

12. The tabbed sealing member of claim 1, wherein a top surface of the upper member is wax bonded to a liner.

13. The tabbed sealing member of claim 1, further including a partial layer between the upper member and lower member forming the partial bond therebetween.

14. The tabbed sealing member of claim 13, wherein a thickness of the partial layer is consistent to a thickness of the folded sheet when folded.

15. A laminate sheet configured to form a tabbed sealing member having a periphery, the laminate sheet comprising:

a lower member including at least a seal layer for bonding to a container rim;

an upper member including one or more layers and partially bonded to the lower member and including a free portion thereof not bonded to the lower member;

a hinge joint formed by the partial bond between the upper member and the lower member, the hinge joint permitting the upper member free portion to pivot away from the lower member to form a gripping tab when formed as the tabbed sealing member; and a folded sheet with a first folded portion bonded to the upper member free portion, a second folded portion bonded to a portion of the lower member below the free portion, and a dead fold aligned with the hinge joint, an inner surface of the first folded portion is not bonded to a facing inner surface of the second folded portion, wherein the folded sheet is non-symmetrical with one of the first folded portion or the second folded portion extending to a periphery of the tabbed sealing member and the other of the first folded portion or the second folded portion has a distal end spaced from the periphery of the tabbed sealing member.

16. A tabbed sealing member for bonding to a rim surrounding a container opening, the tabbed sealing member comprising:

a lower member including at least a seal layer for bonding to a container rim;

an upper member including one or more layers and partially bonded to the lower member and including a free portion thereof not bonded to the lower member;

a hinge joint formed by the partial bond between the upper member and the lower member, the hinge joint permitting the upper member free portion to pivot away from the lower member to form a gripping tab;

a folded sheet having a thickness and including a first folded portion bonded to the upper member free portion, a second folded portion bonded to a portion of the lower member below the free portion, and a dead fold aligned with the hinge joint, an inner surface of the first folded portion is not bonded to a facing inner surface of the second folded portion; and a partial layer between the upper member and lower member forming the partial bond therebetween, the partial layer having a thickness, wherein the thickness of the partial layer is consistent to the thickness of the folded sheet when folded.

17. The tabbed sealing member of claim 16, wherein the folded sheet is non-tubular.

18. The tabbed sealing member of claim 16, wherein the folded sheet includes an inner polymer layer and an outer polymer layer, the outer polymer layer is a heat activated polymer forming the bond between the first folded portion and the upper member free portion and the second folded portion and the portion of the lower member below the free portion.

* * * * *